United States Patent
Mackenzie et al.

(10) Patent No.: US 12,186,724 B2
(45) Date of Patent: Jan. 7, 2025

(54) METHODS AND SYSTEMS FOR TRANSPORTING VISCOUS FLUIDS IN A MOVING HYDROGEL TUBE

(71) Applicant: The University of British Columbia, Vancouver (CA)

(72) Inventors: Jordan Mackenzie, Vancouver (CA); Dominic Mark Martinez, Vancouver (CA); Sean Matthew Delfel, Vancouver (CA); Michael Buchen, Vancouver (CA); Rami Younes, Vancouver (CA)

(73) Assignee: The University of British Columbia, Vancouver (CA)

(*) Notice: Subject to any disclaimer, the term of this patent is extended or adjusted under 35 U.S.C. 154(b) by 0 days.

(21) Appl. No.: 18/653,698

(22) Filed: May 2, 2024

(65) Prior Publication Data

US 2024/0367133 A1    Nov. 7, 2024

Related U.S. Application Data

(60) Provisional application No. 63/499,692, filed on May 2, 2023.

(51) Int. Cl.
*B01J 14/00* (2006.01)
*C08J 3/02* (2006.01)

(52) U.S. Cl.
CPC ............ *B01J 14/00* (2013.01); *C08J 3/02* (2013.01); *C08J 2205/022* (2013.01)

(58) Field of Classification Search
None
See application file for complete search history.

(56) References Cited

U.S. PATENT DOCUMENTS 2,821,205 A * 1/1958 Chilton ............ F15D 1/06
                                          137/13
3,434,485 A * 3/1969 Lummus ........... C09K 8/68
                                          507/90

(Continued)

FOREIGN PATENT DOCUMENTS

WO    2021179083 A1    9/2021

OTHER PUBLICATIONS

M. E. Charles, G. W. Govier, & G. W. Hodgson. The horizontal pipeline flow of equal density oil-water mixtures. Can. J. Chem. Eng. 39: 27-36, 1961.

(Continued)

*Primary Examiner* — Peter A Salamon
(74) *Attorney, Agent, or Firm* — Todd A. Rattray, Oyen Wiggs Green & Mutala LLP

(57) ABSTRACT

A method for transporting a material (which may be a viscous fluid) in a conduit defined by a conduit-defining surface comprises: flowing a first fluid and a second fluid in a flow direction within the conduit; contacting the first and second fluids to one another at a contact region to thereby facilitate a reaction creating a reaction product in an interface region that extends downstream from the contact region, wherein the reaction product is an elastic-solid; and transporting the material in the flow direction within the conduit. At locations downstream of interface region, the reaction product creates a barrier between the viscous fluid and the conduit-defining surface.

21 Claims, 9 Drawing Sheets

(56) References Cited

U.S. PATENT DOCUMENTS

| | | | | |
|---|---|---|---|---|
| 2009/0133756 | A1* | 5/2009 | Peysson | F17D 1/16 137/13 |
| 2010/0200239 | A1* | 8/2010 | Aften | F17D 1/16 166/308.2 |
| 2011/0226472 | A1* | 9/2011 | Kieffer | F17D 1/17 166/270.1 |

OTHER PUBLICATIONS

G. Ooms. The hydrodynamic stability of core-annular flow of two ideal liquids. Applied Scientific Research, 26:147-158, 1972.
G V. A. Oliemans & G. Ooms. Core-annular flow of oil and water through a pipeline. in Multiphase Science and Technology: vol. 2 (Springer Berlin Heidelberg, 1986), Chap. 6, pp. 427-476.
G. Ooms, C Vuik, & P. Poesio. Core-annular flow through a horizontal pipe: Hydrodynamic counterbalancing of buoyancy force on core. Phys. Fluids, 19:092103, 2007.
P. Sarmadi, S. Hormozi,& I.A. Frigaard. Triple-layer configuration for stable high-speed lubricated pipeline transport. Physical Review Fluids 2, 044302 (2017).
M. A. Moyers-Gonzalez, I. A. Frigaard, & C. Nouar. Nonlinear stability of a visco-plastically lubricated viscous shear flow. J. Fluid Mech. 506, 117-146 (2004).
S. Hormozi, K. Wielage-Burchard, & I. A. Frigaard. Entry, start up and stability effects in visco-plastically lubricated pipe flows. J. Fluid Mech. 673, 432-467, 2011.
I. A. Frigaard. Super-stable parallel flows of multiple visco-plastic fluids. J. Non-Newtonian Fluid Mech. 100, 49-75, 2001.
S. Hormozi and I. A. Frigaard. Nonlinear stability of a visco-plastically lubricated viscoelastic fluid flow. J. Non-Newtonian Fluid Mech. 169-170, 61-73, 2012.
M. Moyers-Gonzalez, I. A. Frigaard, & C. Nouar. Stable two-layer flows at all Re; visco-plastic lubrication of shear-thinning and viscoelastic fluids. J. Non-Newtonian Fluid Mech. 165, 1578-1587, 2010.
C. K. Huen, I. A. Frigaard, & D. M. Martinez. Experimental studies of multi-layer flows using a visco-plastic lubricant. J. Non-Newtonian Fluid Mech. 142, 150-161, 2007.
S. Hormozi, D. M. Martinez, & I. A. Frigaard. Stable core-annular flows of viscoelastic fluids using the visco-plastic lubrication technique. J. Non-Newtonian Fluid Mech. 166, 1356-1368, 2011.

L. Yang, Y. Luo, T. Qiu, H. Zheng & P. Zeng A novel analytical study on the buckling of cylindrical shells subjected to arbitrarily distributed external pressure. European Journal of Mechanics / A Solids 91, 104406 (2022).
L.G. Leal. Advanced transport phenomena: fluid mechanics and convective transport processes (vol. 7). Cambridge University Press, pp. 232, 2007.
A. Bannwart, O. Rodriguez, C. de Carvalho, I. Wang, & R. Vara. Flow patterns in heavy crude oil-water flow. J. Energy Resource Tech., 126: 184-189, 2004.
G. Sotgia, P. Tartarini, & E. Stalio. Experimental analysis of flow regimes and pressure drop reduction in oil-water mixtures. Int. J. Multiphase Flow, 34: 1161-1174, 2008.
J. Sun, L. Guo, J. Fu, J. Jing, X. Yin, Y. Lu, A. Ullmann, & N. Brauner. A new model for viscous oil-water eccentric core annular flow in horizontal pipes. Int. J. Multiphase Flow, 147: 103892, 2022.
SA Ahmed and B. John. Liquid-liquid horizontal pipe flow—a review. J Petroleum Science, 168: 426-447, 2018.
O. Rodriguez, A. Bannwart, and C. de Carvalho. Pressure loss in core-annular flow: modelling, experimental investigation and full scale experiments. J Petroleum Science, 65: 67-75, 2009.
M. McKibben, R. Gillies, and C. Shook. Predicting pressure gradients in heavy oil-water pipelines. Can. J. Chem Eng., 78: 752-756, 2000.
J. Mackenzie et al., "Fibre-reinforced biocompatible hydrogel to replace single-use plastic tubing in the clinical setting", Chemical Engineering Journal 428 (2022).
William T. Snyder, "An Analysis of Slug Flow Heat Transfer in an Eccentric Annulus", Brookhaven National Laboratory, Upton, New York, A.I. Ch.E. Journal, vol. 9, No. 4, pp. 503-506, 1963.
William T. Snyder et al., "An Analysis of Fully Developed Laminar Flow in an Eccentric Annulus", A.I. Ch.E. Journal, pp. 462-467, 1965.
Ammar Bensakhria et al., "Experimental Study of the Pipeline Lubrication for Heavy Oil Transport", Article in Oil & Gas Science and Technology—Sep. 2004.
Licai Yang et al., "Buckling of cylindrical shells with general axisymmetric thickness imperfections under external pressure", European Journal of Mechanics A/Solids 38 (2013) 90-99.
Baohsan Xie et al., "Review of Core Annular Flow", Energies 2023.
S. Hormozi et al., "Multi-layer channel flows with yield stress fluids", J. Non-Newtonian Fluid Mech. 166, 262-278, 2011.

* cited by examiner

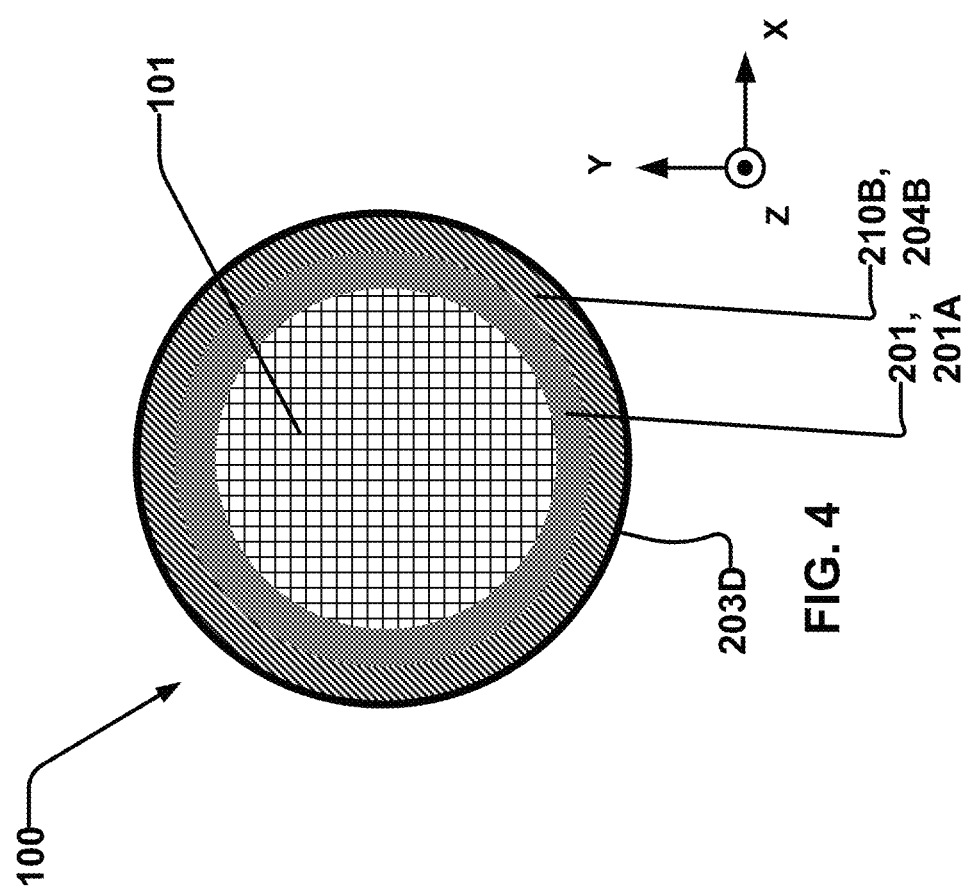

METHODS AND SYSTEMS FOR TRANSPORTING VISCOUS FLUIDS IN A MOVING HYDROGEL TUBE

REFERENCE TO RELATED APPLICATIONS

This application claims priority from, and for the purposes of the United States of America the benefit under 35 USC 119 in relation to, U.S. Patent Application No. 63/499,692 filed 2 May 2023 the entire disclosure of which is hereby incorporated herein by reference.

FIELD

This invention relates to the reduction of drag forces resulting from the flow of materials. Particular embodiments provide methods and systems for transporting material through encapsulation with hydrogel tubing made using 3D extrusion printing. This invention may have applications in the oil and gas sector, the mining sector, or in a variety of other sectors.

BACKGROUND

There is a general desire to reduce drag forces.

Drag reduction is a classic problem in fluid dynamics with its analysis paving the way for managing frictional losses in transporting viscous fluids. Technologies related to drag reduction have commonly been advanced in the oil and gas sector, where viscous fluids such as heavy crude oil, bitumen and/or the like are commonly transported in pipelines. This in part is due to the increasing energy costs and increasing demands associated with transporting heavy crude oil, bitumen and/or the like. Current technologies include dilution, heating, emulsification with water, addition of drag reducing additives and core-annular lubricated flows. Using a drag reduction strategy commonly affords a longer lifespan for the transporting conduit due to associated reduction in shear stress on conduit walls.

Calibrating the pressure loss in fully developed pipe flows has been a long standing field of study that is routinely explored in terms of the Fanning friction factor, defined as $$f = \frac{2\tau_w}{\rho u_c^2} = \left(\frac{\Delta P}{L}\right)\frac{R}{\rho u_c^2},$$

wnere $u_c$ denotes the characteristic velocity, $\rho$ denotes the density of the fluids, R denotes the radius of the conduit;

$$\left(\frac{\Delta P}{L}\right)$$

is the pressure drop per unit length in the conduit; and $\tau_w$ denotes wall shear stress. In Canadian oil pipelines, wall shear stresses can exceed $\tau_w \gg 10^2$ Pa.

Under laminar conditions, the friction factor can be taken to be $f=16/Re$, where the Reynolds number can be defined as $$Re = \frac{\rho D u_c}{\mu}$$

where $\mu$ denotes the viscosity of the fluid at the pipe wall and $D=2R$ is the diameter of the conduit.

For fully turbulent flows of Newtonian fluids, the empirically determined Colebrook equation estimates the friction factor in conduits that vary in surface $$\frac{1}{\sqrt{f}} = -4\log\left(\frac{\epsilon/D}{3.7} + \frac{1.255}{Re\sqrt{f}}\right),$$

roughness. The Colebrook equation is defined as where E denotes unit-less surface roughness parameter. Typically, flows that contain drag reducing additives yield a friction factor well below that of Colebrook due to the drop in turbulent energy.

In core-annular lubricated flows a less viscous, immiscible fluid (typically water) is injected into the flow of a more viscous fluid, and under certain operating conditions the lower viscosity fluid forms an annular ring around the more viscous fluid at the core. This may be referred to as a two-layer flow, where the lubricating film is in direct contact with the viscous core. As a result, only the lower viscosity fluid interacts with the walls of the pipe, reducing drag and pressure drop relative to the drag and pressure drop of the more viscous fluid only. However, the flow conditions under which core-annular flow can be maintained are limited. Further, core-annular flows are easily disrupted by bends/elbows, pipe fittings, other surface discontinuities and/or the like. Traditional core-annular flow has also been found to be susceptible to fouling, where the viscous fluid at the core migrates to the conduit walls and accumulates with time. This can disrupt the ability of the core-annular flow to maintain the low viscosity fluid annulus.

To increase the stability of the core-annular flow over a wider range of conditions, the viscous fluid may be encapsulated by a viscoplastic material (e.g. in addition to the annular lubricant). This may be referred to as a three-layer flow, where an inert material separates the lubricating film from the core fluid. Viscoplastic materials, however, can yield when the applied stresses exceed a threshold value. This limits the operating range (e.g. possible encapsulation distances and flow rates) under which steady encapsulation can be achieved. Additionally, it is difficult for the viscoplastic encapsulation material to continue encapsulating the viscous fluid when the transporting conduit changes in geometry. Changes in geometry include widening, narrowing and/or bending of the conduit and/or the like. In the event of a geometry change in the conduit, the viscoplastic encapsulation may be damaged.

A viscoplastic material is a fluid material that behaves as a rigid solid, carries internal stresses, and retains its initial undeformed shape when the magnitude of the applied stresses are below a critical yield stress. When the magnitude of the applied stresses exceed the critical yield stress, a viscoplastic material has a fluid-like behavior. Under fluid-like behavior, a viscoplastic material flows in response to the applied forces and has zero shear modulus. Damages in the viscoplastic capsule in core annular flow result in the viscous fluid coming into contact with the conduit, thereby increasing drag and increasing wear and tear on the conduit. Damages to a viscoplastic capsule in core annular flow can occur for reasons other than changes in geometry of the viscoplastic capsule and/or the conduit. By way of example, when stresses are applied to the viscoplastic that exceed its yield stress, the viscoplastic may engage in mixing with the viscous fluid, thereby damaging the viscoplastic encapsulation. Regardless of how the viscoplastic capsule is damaged, the damaged capsule opens a pathway for the transported viscous fluid to come into contact with the conduit. This increases drag as well as wear and tear on the conduit, thereby reducing the life of the conduit. Additionally, a significant amount of energy is typically required to pump a viscoplastic with a sufficient yield stress needed for core annular flow. Because of this energy requirement, lubricating the pipeline transport of a viscous fluid through viscoplastic encapsulation is often cost prohibitive.

There remains a desire for methods and systems for transporting viscous fluids that reduce the drag associated with transporting the viscous fluids, while mitigating some of the drawbacks associated with prior art techniques.

SUMMARY

This invention has a number of aspects. These include, without limitation:
  Apparatus for transporting viscous fluids;
  Methods for transporting viscous fluids;
  Systems for transporting viscous fluids;
  Using an elastic-solid to reduce drag associated with transporting viscous fluids; and
  Methods for reducing drag associated with transporting viscous fluids.

One aspect of the invention provides a method for transporting a material in a conduit defined by a conduit-defining surface, the method comprising: flowing a first fluid and a second fluid in a flow direction within the conduit; contacting the first and second fluids to one another at a contact region to thereby facilitate a reaction creating a reaction product in an interface region that extends downstream from the contact region, wherein the reaction product is an elastic-solid; and transporting the material in the flow direction within the conduit; wherein, at locations downstream of the interface region, the reaction product creates a barrier between the material and the conduit-defining surface.

Another aspect of the invention provides a method for reducing drag associated with transporting a material in a flow direction in a conduit defined by a conduit-defining surface, the method comprising: facilitating a reaction within the conduit, to thereby create a reaction product that is an elastic-solid and that creates a barrier between the material and the conduit-defining surface, the reaction product and the barrier created by the reaction product moving in the flow direction with the material. The method may further comprise flowing a first fluid and a second fluid in the flow direction within the conduit; and contacting the first and second fluids to one another at a contact region to thereby facilitate the reaction in an interface region that extends downstream from the contact region; wherein the reaction product creates the barrier at locations downstream of the interface region.

Transporting the material in the flow direction within the conduit may comprise flowing a viscous fluid in the flow direction within the conduit. The viscous fluid may comprise a fluid having a viscosity greater than a viscosity of water. The material may comprise one or more of: heavy crude oil, mining tailings, bitumen, a slurry, a paste, or a caustic material. The material may be one of: neutrally buoyant, positively buoyant, or negatively buoyant in the first fluid.

Flowing the first fluid and the second fluid in the flow direction within the conduit may comprise keeping the first and second fluids from contacting one another at locations upstream of the contact region. Flowing the first fluid and the second fluid in the flow direction within the conduit may comprise flowing the first fluid in the flow direction in a first conduit at locations upstream of the contact region and flowing the second fluid in the flow direction in a second conduit at locations upstream of the contact region, the first and second conduits physically separated from one another to thereby keep the first and second fluids from contacting one another at locations upstream of the contact region. The first and second conduits may comprise at least one wall therebetween to keep the first and second conduits physically separated from one another. The at least one wall may be a tubular wall. Contacting the first and second fluids to one another at the contact region may comprise merging the first and second conduits with one another. Contacting the first and second fluids to one another at the contact region may comprise discontinuing the at least one wall at locations upstream of the contact region.

The methods may comprise: flowing a third fluid in the flow direction within the conduit; contacting the second and third fluids to one another at a second contact region to thereby facilitate a reaction creating the reaction product in a second interface region that extends downstream from the second contact region. The third fluid may be the same as the first fluid. The second contact region may be at a same location along the flow direction as the contact region. Flowing the third fluid in the flow direction within the conduit may comprise keeping the second and third fluids from contacting one another at locations upstream of the second contact region. Flowing the second fluid in the flow direction within the conduit may comprise flowing the second fluid in the flow direction in a second conduit at locations upstream of the second contact region and flowing the third fluid in the flow direction in a third conduit at locations upstream of the second contact region, the second and third conduits physically separated from one another to thereby keep the second and third fluids from contacting one another at locations upstream of the second contact region. The second and third conduits may comprise at least one second wall therebetween to thereby keep the second and third conduits physically separated from one another. The at least one second wall may be a tubular wall.

Contacting the second and third fluids to one another at the second contact region may comprise merging the second and third conduits with one another. Contacting the second and third fluids to one another at the second contact region comprises discontinuing the at least one second wall at locations upstream of the second contact region.

Transporting the material in the flow direction within the conduit may comprise keeping the material separate from other materials moving in the flow direction within the conduit at locations upstream of the contact region. Keeping the material separate from other materials moving in the flow direction within the conduit at locations upstream of the contact region may comprise providing a separate conduit for the material, the separate conduit separating the material from the other materials moving in the flow direction within the conduit. Providing the separate conduit for the material may comprise providing at least one third wall that separates the material from the other materials moving in the flow direction within the conduit. The at least one third wall may be a tubular wall. The methods may comprise discontinuing the at least one third wall at locations downstream of the contact region.

In some embodiments, the reaction product and the barrier created by the reaction product move in the flow direction within the conduit.

In some embodiments, at locations downstream of the interface region, the reaction product creates the barrier between the material and the first fluid.

In some embodiments, the reaction product and the barrier created by the reaction product are able to strain in response to stresses. The stresses may be one or more of: elongation stress, hoop stress, and axial stress.

In some embodiments, the first fluid comprises a salt solution. The salt solution may comprise metal ions. The metal ions may be polyvalent metal ions. The polyvalent metal ions may comprise one or more of: divalent metal ions and trivalent metal ions.

In some embodiments, the first fluid comprises a chelating agent.

In some embodiments, the second fluid comprises a hydrogel reactant solution. The hydrogel reactant solution may comprise one or more of alginate or anionic polyacrylamide. The hydrogel reactant solution may comprise one or more of: pulp fiber, phase changing materials, reinforcing agents and polysaccharides.

In some embodiments, one or both of the first and second fluids comprise a UV curable material.

In some embodiments, one or both of the first and second fluids comprise a heat curable material.

In some embodiments, the methods may comprise permitting a secondary reaction between the material and at least one of the first fluid and the third fluid to create a secondary reaction product. The secondary reaction product may comprise a viscoplastic. The secondary reaction product may move in the flow direction within the conduit.

In some embodiments, the methods may comprise permitting the material to mix with a portion of at least one of the first fluid and the third fluid.

In some embodiments, the reaction product has a tensile strength that is greater than the maximum pressure exerted by the material.

In some embodiments, the reaction product has a tensile strength that is greater than or equal to 600 kPa.

In some embodiments, the methods may further comprise: applying a first force to a first region of the reaction product, and applying a second force to a second region of the reaction product, at least a portion of the second region outside of the first region, thereby causing the reaction product to deform. The first force and the second force may have a different magnitude. The first region may be an inner surface of the reaction product, and the second region may be an outer surface of the reaction product. The first force may be created by the application of a first hydraulic pressure at the first region of the reaction product, and wherein the second force may be created by the application of a second hydraulic pressure at the second region of the reaction product.

In some embodiments, the methods may comprise deforming the reaction product by adjusting a flow rate of one or both of the first fluid and the second fluid.

The reaction product may deform one or more of: longitudinally along an axis parallel to the flow direction, transversely in a direction away from the axis parallel to the flow direction, and torsionally about the axis parallel to the flow direction.

The methods may further comprise generating a lift force in a lift direction normal to the conduit defining surface, wherein the lift force is generated by hydrodynamic lift created by the first fluid flowing between the conduit defining surface and the deformed reaction product.

The methods may further comprise generating a lift force in one or more directions away from the conduit defining surface, wherein the lift force is generated by hydrodynamic lift created by the first fluid flowing between the conduit defining surface and the deformed reaction product.

The methods may further comprise biasing the material away from the conduit defining surface with the lift force.

In some embodiments, the methods further comprise stopping the transport of the material in the flow direction within the conduit; maintaining the barrier between the material and the conduit defining surface while the transport of the material is stopped; re-starting the transport of the material in the flow direction within the conduit; and maintaining the barrier after the flow of the material is re-started.

In some embodiments, the methods may further comprise encapsulating the material with the reaction product.

In some embodiments, the methods may further comprise isolating the conduit defining surface from the material with the barrier created by the reaction product. The methods may further comprise inhibiting fouling of the conduit defining surface with the barrier. The methods may further comprise inhibiting rusting of the conduit defining surface with the barrier.

Another aspect of the invention provides use of an elastic-solid to reduce drag associated with transporting a material in a flow direction in a conduit defined by a conduit-defining surface, the use comprising: facilitating a reaction within the conduit, to thereby create a reaction product that is an elastic-solid and that creates a barrier between the material and the conduit-defining surface, the reaction product and the barrier created by the reaction product moving in the flow direction with the material. The use may comprise flowing a first fluid and a second fluid in the flow direction within the conduit; and contacting the first and second fluids to one another at a contact region to thereby facilitate the reaction in an interface region that extends downstream from the contact region; wherein the reaction product creates the barrier at locations downstream of the interface region.

Transporting the material in the flow direction within the conduit may comprise flowing a viscous fluid in the flow direction within the conduit. The viscous fluid may have a viscosity greater than a viscosity of water. The material may comprise one or more of: heavy crude oil, mining tailings, bitumen, a slurry, a paste, or a caustic material. The material may be one of: neutrally buoyant, positively buoyant, or negatively buoyant in the first fluid.

Flowing the first fluid and the second fluid in the flow direction within the conduit may comprise keeping the first and second fluids from contacting one another at locations upstream of the contact region. Flowing the first fluid and the second fluid in the flow direction within the conduit may comprise flowing the first fluid in the flow direction in a first conduit at locations upstream of the contact region and flowing the second fluid in the flow direction in a second conduit at locations upstream of the contact region, the first and second conduits physically separated from one another to thereby keep the first and second fluids from contacting one another at locations upstream of the contact region. The first and second conduits may comprise at least one wall therebetween to keep the first and second conduits physically separated from one another. The at least one wall may be a tubular wall. Contacting the first and second fluids to one another at the contact region may comprise merging the first and second conduits with one another. Contacting the first and second fluids to one another at the contact region may comprise discontinuing the at least one wall at locations upstream of the contact region.

The use may also comprise: flowing a third fluid in the flow direction within the conduit; contacting the second and third fluids to one another at a second contact region to thereby facilitate a reaction creating the reaction product in a second interface region that extends downstream from the second contact region. The third fluid may be the same as the first fluid. The second contact region may be at a same location along the flow direction as the contact region. Flowing the third fluid in the flow direction within the conduit may comprise keeping the second and third fluids from contacting one another at locations upstream of the second contact region. Flowing the second fluid in the flow direction within the conduit may comprise flowing the second fluid in the flow direction in a second conduit at locations upstream of the second contact region and flowing the third fluid in the flow direction in a third conduit at locations upstream of the second contact region, the second and third conduits physically separated from one another to thereby keep the second and third fluids from contacting one another at locations upstream of the second contact region. The second and third conduits may comprise at least one second wall therebetween to thereby keep the second and third conduits physically separated from one another. The at least one second wall may be a tubular wall.

Contacting the second and third fluids to one another at the second contact region may comprise merging the second and third conduits with one another. Contacting the second and third fluids to one another at the second contact region may comprise discontinuing the at least one second wall at locations upstream of the second contact region.

Transporting the material in the flow direction within the conduit may comprise keeping the material separate from other materials moving in the flow direction within the conduit at locations upstream of the contact region. Keeping the material separate from other materials moving in the flow direction within the conduit at locations upstream of the contact region may comprise providing a separate conduit for the material, the separate conduit separating the material from the other materials moving in the flow direction within the conduit. Providing the separate conduit for the material may comprise providing at least one third wall that separates the material from the other materials moving in the flow direction within the conduit. The at least one third wall may be a tubular wall. The use may comprise discontinuing the at least one third wall at locations downstream of the contact region.

In some embodiments, the reaction product and the barrier created by the reaction product move in the flow direction within the conduit.

In some embodiments, at locations downstream of the interface region, the reaction product creates the barrier between the material and the first fluid.

In some embodiments, the reaction product and the barrier created by the reaction product are able to strain in response to stresses. The stresses may be one or more of: elongation stress, hoop stress, and axial stress.

In some embodiments, the first fluid comprises a salt solution. The salt solution may comprise metal ions. The metal ions may comprise polyvalent metal ions. The polyvalent metal ions may comprise one or more of: divalent metal ions and trivalent metal ions.

In some embodiments, the first fluid comprises a chelating agent.

In some embodiments, the second fluid comprises a hydrogel reactant solution. The hydrogel reactant solution may comprise one or more of alginate or anionic polyacrylamide. The hydrogel reactant solution may comprise one or more of: pulp fiber, phase changing materials, reinforcing agents and polysaccharides.

In some embodiments, one or both of the first and second fluids comprise a UV curable material.

In some embodiments, one or both of the first and second fluids comprise a heat curable material.

In some embodiments, the use may further comprise permitting a secondary reaction between the material and at least one of the first fluid and the third fluid to create a secondary reaction product. The secondary reaction product may comprise a viscoplastic. The secondary reaction product may move in the flow direction within the conduit.

In some embodiments, the use may further comprise permitting the material to mix with a portion of at least one of the first fluid and the third fluid.

In some embodiments, the reaction product has a tensile strength that is greater than the maximum pressure exerted by the material.

In some embodiments, the reaction product has a tensile strength that is greater than or equal to 600 kPa.

In some embodiments, the use may further comprise applying a first force to a first region of the reaction product, and applying a second force to a second region of the reaction product, at least a portion of the second region outside of the first region, thereby causing the reaction product to deform. The first force and the second force may have a different magnitude. The first region may be an inner surface of the reaction product, and wherein the second region may be an outer surface of the reaction product. The first force may be created by the application of a first hydraulic pressure at the first region of the reaction product, and wherein the second force may be created by the application of a second hydraulic pressure at the second region of the reaction product.

In some embodiments, the use may comprise deforming the reaction product by adjusting a flow rate of one or both of the first fluid and the second fluid.

The reaction product may deform one or more of: longitudinally along an axis parallel to the flow direction, transversely in a direction away from the axis parallel to the flow direction, and torsionally about the axis parallel to the flow direction.

The use may further comprise generating a lift force in a lift direction normal to the conduit defining surface, wherein the lift force is generated by hydrodynamic lift created by the first fluid flowing between the conduit defining surface and the deformed reaction product.

The use may further comprise generating a lift force in one or more directions away from the conduit defining surface, wherein the lift force is generated by hydrodynamic lift created by the first fluid flowing between the conduit defining surface and the deformed reaction product.

The use may further comprise biasing the material away from the conduit defining surface with the lift force.

In some embodiments, the use may further comprise: stopping the transport of the material in the flow direction within the conduit; maintaining the barrier between the material and the conduit defining surface while the transport of the material is stopped; re-starting the transport of the material in the flow direction within the conduit; and maintaining the barrier after the flow of the material is re-started.

In some embodiments, the use may further comprise encapsulating the material with the reaction product.

In some embodiments, the use may further comprise isolating the conduit defining surface from the material with the barrier created by the reaction product. In some embodiments, the use may further comprise inhibiting fouling of the conduit defining surface with the barrier. In some embodiments, the use may further comprise inhibiting rusting of the conduit defining surface with the barrier.

Further aspects and example embodiments are illustrated in the accompanying drawings and/or described in the following description.

It is emphasized that the invention relates to all combinations of the above features, even if these are recited in different claims.

BRIEF DESCRIPTION OF THE DRAWINGS

The accompanying drawings illustrate non-limiting example embodiments of the invention.

FIG. 4 is a cross-sectional schematic diagram of the example system of FIG. 1 at another different axial location taken at the line 4-4 shown in FIG. 1.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

Figure 1:
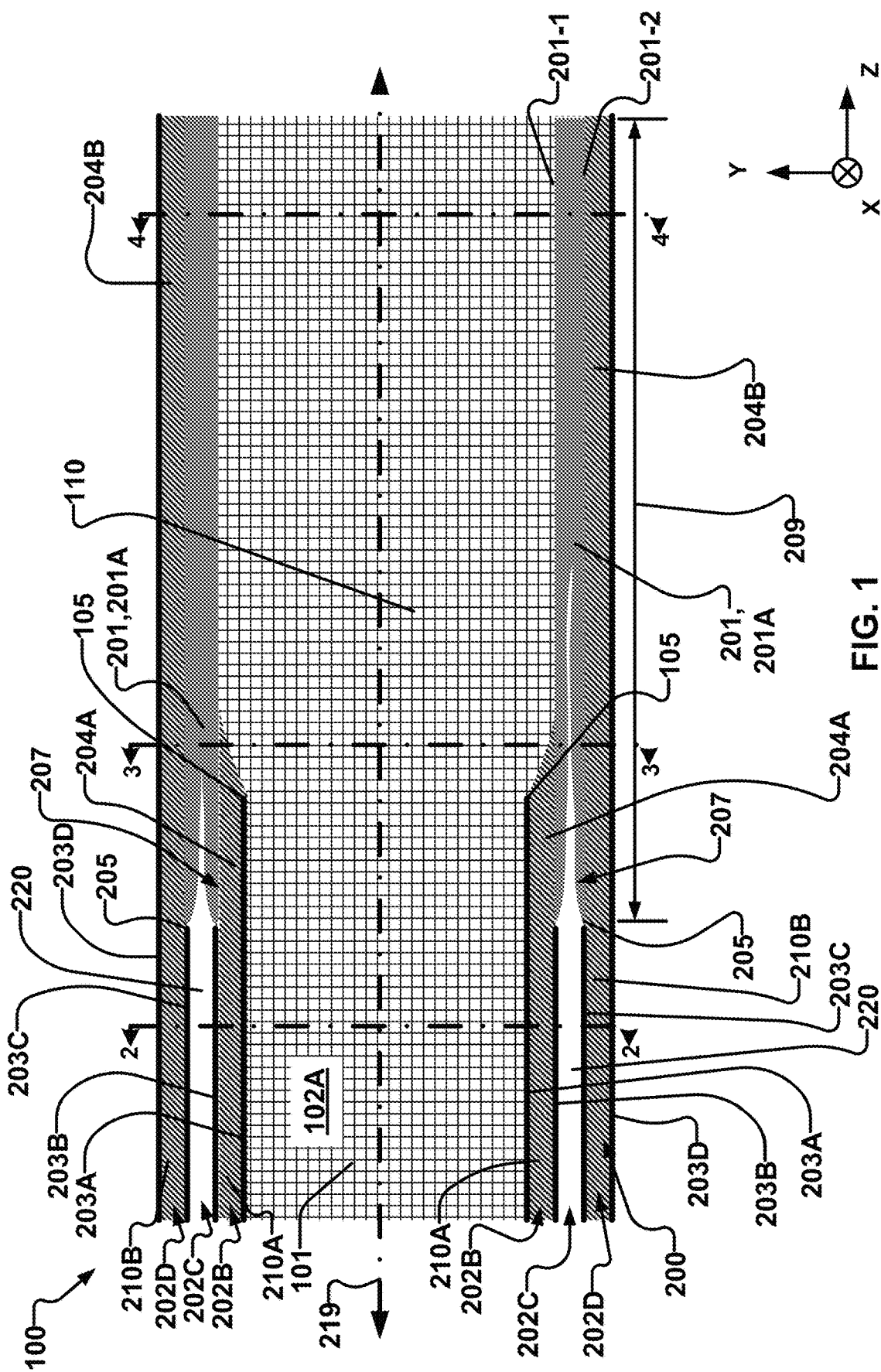
FIG. 1 is a cross-sectional schematic diagram of an example system that transports viscous fluids with encapsulation according to an example embodiment.

FIG. 1 is a cross-sectional view of a portion of an example material transportation system 100 according to an example embodiment. System 100 may have applications in the transport of materials. Example materials include, without limitation, polymers, oils, bitumen, slurries (e.g. liquid solid slurries such as tailings (e.g. from mining) and the like), and/or pastes, and/or the like. Without limiting the generality of the materials that could be transported, an example type of material that can be transported is a viscous fluid. System 100 may reduce the drag associated with transporting viscous fluids in a conduit (e.g. a pipe) relative to the drag associated with transporting such viscous fluids on their own in the conduit. System 100 may allow a viscous fluid to be encapsulated by an elastic-solid material while being transported. The use of an elastic-solid material to encapsulate the viscous fluid is particularly advantageous in comparison to a core-annular flow and to viscoplastic encapsulation, due to the elastic nature of the elastic-solid material. The elastic-solid material is a solid that advantageously can expand and contract to match the shape of the conduit (e.g. bends, pipe joints and fittings and/or the like) and/or viscous fluids, thereby maintaining its encapsulation effect in the face of elongational and/or shear stresses and maintaining its drag-reducing effect under such stresses.

System 100 may comprise conduit 102A. Conduit 102A may comprise a central (axial) bore defined by a bore-defining tubular wall 203A. Conduit 102A may receive viscous fluid 101. Viscous fluid 101 may also comprise a caustic material. Viscous fluid 101 may be any fluid that has a viscosity greater than the viscosity of water. Viscous fluid 101 may comprise a neutrally buoyant or strongly buoyant material in comparison to an elastic-solid reaction product 201 (described in more detail below) and/or water. In some embodiments, viscous fluid 101 may be negatively buoyant.

System 100 may also comprise hydrogel production system 200. Hydrogel production system 200 may produce reaction product 201 as has been previously described, for example, in Patent Cooperation Treaty (PCT) application No. PCT/CA2021/050326 entitled LARGE-SCALE 3D EXTRUSION PRINTING and/or PCT application No. PCT/CA2022/051899 entitled CREATING HYDROGEL FILMS USING A MULTILAYERED EXTRUSION REACTOR APPARATUS, both of which PCT applications are hereby incorporated herein by reference. Advantageously, reaction product 201 may be a solid but may have elastic properties and may be referred to herein as elastic-solid material 201 or elastic-solid reaction product 201.

Figure 2:
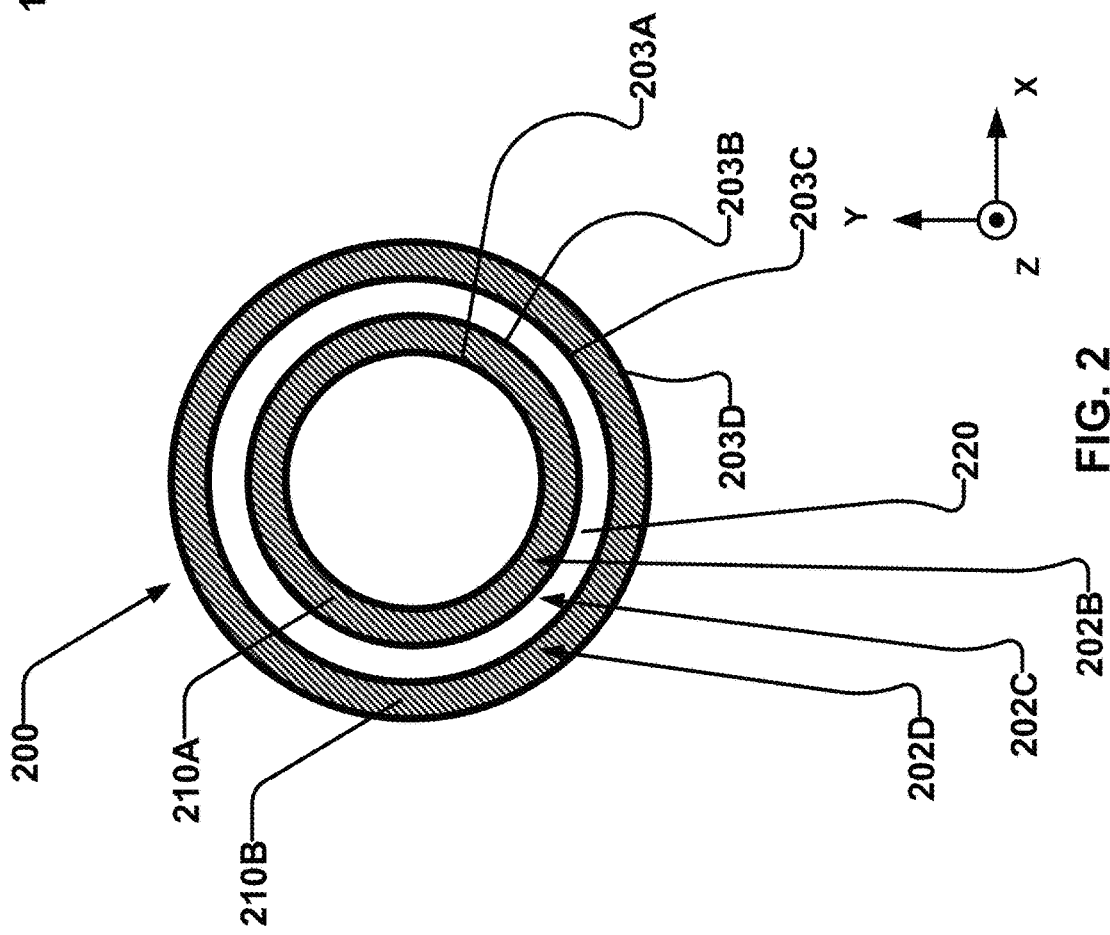
FIG. 2 is a cross-sectional schematic diagram of the example system of FIG. 1 at a first axial location taken at the line 2-2 shown in FIG. 1.

In some embodiments, hydrogel production system 200 is shaped to define annular passages 202B, 202C and 202D (collectively referred to herein as passages 202 or conduits 202). Conduits 202 may be defined by tubular walls 203A, 203B, 203C and 203D (collectively referred to herein as tubular walls 203) with the outermost one of tubular walls 203D referred to herein as a conduit-defining surface 203D, since it defines unified conduit 110 (described in more detail below). Tubular walls 203 may be arranged to share (and/or to be symmetric about) a z-oriented axis 219 (see coordinate system shown in FIG. 1), although this is not strictly necessary. Tubular walls 203 may be circular or ellipsoidal in shape in a cross-section taken in an x-y plane, although, again, this is not strictly necessary. In general, tubular walls 203 are not limited in their x-y plane cross-sectional shapes. FIG. 2 is an x-y plane cross-section of an example system 200 taken at a first z-location represented by line 2-2 in FIG. 1. Annular passage (conduit) 202B may be defined as the space between walls 203A and 203B. Annular passage (conduit) 202C may be defined as the space between walls 203B and 203C. Annular passage (conduit) 202D may be defined as the space between tubular walls 203C and 203D.

Annular passages 202B, 202C, 202D may each receive an input material through an inlet (not shown). The inlets may take any suitable form including for example a pipe or a hose. Inlets may be oriented to be in any suitable direction. In some embodiments, an inlet may be oriented such that a longitudinal dimension of the inlet is generally parallel with a z dimension of annular passages 202.

Conduit 202B may receive salt solution 210A and conduit 202D may receive salt solution 210B (collectively referred to herein as salt solution 210). Salt solution 210 may comprise a base salt solution of reactants, which may be any suitable salt solution as previously described, for example, in PCT/CA2021/050326 and/or PCT/CA2022/051899. In some embodiments suitable salt solutions comprise a salt solution comprising polyvalent (e.g. divalent and/or trivalent) metal ions such as $Ca^{2+}$, $Pb^{2+}$, $Cu^{2+}$, $Cd^{2+}$, $Ba^{2+}$, $Sr^{2+}$, $Co^{2+}$, $Ni^{2+}$, $Zn^{2+}$, $Mn^{2+}$, $Al^{3+}$, combinations of these metal ions and/or the like. In come embodiments, salt solution 210 may comprise calcium chloride ($CaCl_2$), calcium sulphate ($CaSO_4$), iron (II) chloride ($FeCl_2$) and/or the like. One or both of salt solutions 210A, 210B may comprise one or more secondary reactants, one or more inert components and/or one or more additives. The inclusion of secondary reactants, inert components and/or additives may improve general functionality, provide secondary functionalities and/or reduce costs associated with system 100. For example, in some embodiments, additives may mitigate unwanted properties found in viscous fluid 101, reduce drag and/or reduce rusting. The secondary reactants, inert components and/or additives of salt solution 210A may be the same as or different than the secondary reactants and/or additives of salt solution 210B. For example, in some embodiments salt solution 210A may include a first additive that mitigates unwanted properties of viscous fluid 101 and salt solution 210B may include a second additive that reduces drag and a chelating agent. A chelating agent may prevent rusting in the walls of system 100 which may in turn prolong the lifespan of system 100.

Conduit 202C may receive a hydrogel reactant solution 220. Hydrogel reactant solution 220 may comprise any suitable hydrogel reactant(s) as previously described in PCT/CA2021/050326 and/or PCT/CA2022/051899. In some embodiments, suitable hydrogel reactants comprise an ionically cross-linkable hydrogel, such as alginates, alginic acids, nano-fibrillated cellulose (NFC), combinations of these materials and/or the like. In some embodiments, suitable hydrogel reactants comprise alginates. In some embodiments, hydrogel reactants comprise anionic polyacrylamide. Hydrogel reactant solution 220 may comprise one or more secondary reactants, one or more inert components and/or one or more additives. The inclusion of secondary reactants, inert components and/or additives may improve general functionality, provide secondary functionalities and/or reduce costs associated with system 100. For example, secondary reactants, inert components and/or additives may provide strengthening functionalities. Hydrogel reactant solution 220 may include additives such as pulp fiber, phase changing materials, reinforcing agents and/or polysaccharides. In some embodiments, fiber additives may be used to stiffen elastic-solid reaction product 201. In some embodiments, it may be desirable for reaction product 201 to have a tensile strength greater than 600 kPa.

In some embodiments, salt solution 210 may have a salt concentration of 1.0% (w/w) or greater to react with hydrogel reactant solution 220 of at least 0.25% (w/w) concentration of hydrogel reactant. The hydrogel reactant may comprise alginate, pulp fiber and/or other phase change materials (e.g. those UV curable materials described in PCT/CA2021/050326 and/or PCT/CA2022/051899), reinforcing agents and/or polysaccharides. In some embodiments, the linear velocity ratio between salt solution 210 within conduits 202B and 202D and hydrogel reactant solution 220 within conduit 202C may be close to unity. For example, in some embodiments, this linear velocity ratio is in a range of about [0.8:1.2]; in some embodiments, this linear velocity ratio is in a range of about [0.9:1.1].

Tubular walls 203B, 203C may be shaped such that salt solution 210 comes into contact with hydrogel reactant solution 220 at reaction contact region 205. One or both of tubular walls 203B, 203C may terminate at reaction contact region 205, at which point salt solution 210 and hydrogel reactant solution 220 may be directed into reaction conduit 207. At reaction contact region 205 and at the upstream end of reaction conduit 207, salt solution 210 and hydrogel reactant solution 220 may be arranged such that salt solution 210 is adjacent to both tubular walls 203A and 203D to form lubricating salt solution layers 204A and 204B (collectively referred to as lubricating salt solution layers 204). Lubricating salt solution layer 204A may comprise salt solution 210A. Lubricating salt solution layer 204B may comprise salt solution 210B. The presence of lubricating salt solution layers 204 may mitigate the likelihood that elastic-solid reaction product 201 comes into contact with tubular walls 203A, 203D. In some embodiments, it may be desirable to introduce salt solution 210 into conduits 202B, 202D prior to introducing hydrogel reactant solution 220 into conduit 202C, such that salt solution 210 is present at reaction contact region 205 and in reaction conduit 207 prior to hydrogel reactant solution 220. This introduction of salt solution to reaction conduit 207 prior to hydrogel reactant solution 220 may also mitigate the likelihood that elastic-solid reaction product 201 comes into contact with tubular walls 203A, 203D.

Figure 3:
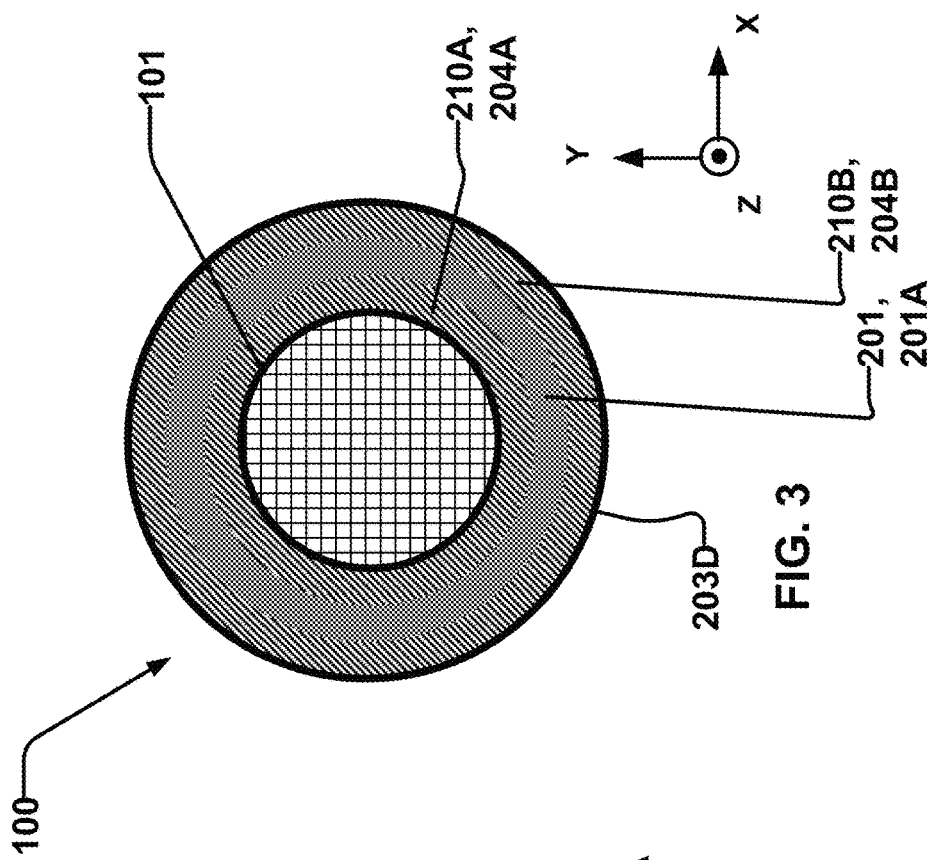
FIG. 3 is a cross-sectional schematic diagram of the example system of FIG. 1 at a different axial location taken at the line 3-3 shown in FIG. 1.

Salt solution 210 may react with hydrogel reactant solution 220 to produce reaction product 201 in reaction interface region 209. Interface region 209 may have an upstream extremity at reaction contact region 205 (e.g. where tubular walls 203B, 203C end and/or where salt solutions 210A, 210B come into contact with hydrogel reactant solution 220) and may extend downstream from reaction contact region 205. Reaction product 201 comprises an elastic solid. Elastic-solid reaction product 201 is able to support a tensile load and strain (elastically deform) in response to stresses which may include hoop stress (in directions orthogonal to the z-direction and/or to axis 219 shown in FIG. 1), axial stress (in directions parallel to the z-direction and/or to axis 219 shown in FIG. 1) and combinations thereof. Lubricating salt solution layers 204 surround hydrogel reactant solution 220 and reaction product 201 (see e.g. FIG. 3 which depicts a cross-section of the FIG. 1 system 100 in a z dimension location of reaction conduit 207—see line 3-3 in FIG. 1). Lubricating salt solution layers 204 may ensure either or both of hydrogel reactant solution 220 and reaction product 201 do not come into contact with tubular walls 203A and 203D. Reaction contact region 205 may form an upstream extremity of reaction interface region 209. Reaction interface region 209 may extend downstream from contact region 205. Salt solution 210 and hydrogel reactant solution 220 may be separated by elastic-solid reaction product 201 at some locations downstream of reaction contact region 205. Salt solution 210, hydrogel reactant solution 220 and elastic-solid reaction product 201 may continue to flow (in the case of fluid solutions 210, 220) or otherwise move (in the case of elastic-solid reaction product 201) downstream of contact region 205.

Tubular wall 203A may terminate downstream of contact region 205 at encapsulate region 105. At encapsulate region 105, viscous fluid 101 in conduit 102A and the contents of reaction conduit 207 (e.g. salt solution 210, hydrogel reactant solution 220 and elastic-solid reaction product 201) may be directed into unified conduit 110. At encapsulate region 105 and downstream of encapsulation region 105, viscous fluid 101 comes into contact with salt solution 210A and/or lubricating salt solution layer 204A. In some embodiments, when salt solution 210A comes into contact with viscous fluid 101, salt solution 210A may mix with viscous fluid 101 (e.g. if the viscosity ratios between salt solution 210A and viscous fluid 101 permit such mixing). Such mixing is shown, for example, in the embodiment of FIG. 1. In some embodiments, where salt solution 210A and viscous fluid 101 are immiscible but the environmental conditions drive mixing, salt solution 210A and viscous fluid may form an emulsion state downstream of contact region 205. In some embodiments, where salt solution 210A and viscous fluid 101 are immiscible and the environmental conditions do not drive mixing, then salt solution 210A may continue to flow between reaction product 201 and viscous fluid (e.g. in a manner similar to salt solution 204A in reaction conduit 207).

In some embodiments, salt solution 210A and viscous fluid 101 may undergo a secondary reaction when they come into contact. For example, a secondary reaction may form a viscoplastic material. The viscoplastic material may form a lubrication layer that encapsulates viscous fluid 101, while being protected from the conduit-defining surface 203D of system 100 by elastic-solid reaction product 201. Other examples of secondary reactions include adding chelating agents to reduce or mitigate species which may tend to react (e.g. rust) tubular walls 203. The mixing of salt solution 210A with viscous fluid 101 and/or the secondary reaction between salt solution 210A and viscous fluid 101 may result in a termination of lubricating salt solution layer 204A downstream of encapsulation region 105 (as shown in FIG. 1).

At encapsulation region 105 and downstream of encapsulation region 105, elastic-solid reaction product 201 encapsulates viscous fluid 101 in unified conduit 110 (see e.g. FIG. 4 which depicts a cross-section of the FIG. 1 system 100 in a z dimension location corresponding to unified conduit 110—see line 4-4 in FIG. 1). In this way reaction product 201 may act as a lubricant (e.g. reducing drag) between viscous fluid 101 and conduit-defining surface 203D, thereby aiding the transport of viscous fluid 101 through unified conduit 110. Elastic-solid reaction product 201 may move with viscous fluid 101 throughout unified conduit 110. Within some upstream regions of unified conduit 110, salt solution 210 may continue reacting with hydrogel reactant solution 220. Unless the context dictates otherwise, encapsulation (as used herein) of viscous fluid 101 by elastic-solid reaction product 201 refers to reaction product 201 creating a barrier 201A between viscous fluid 101 and conduit-defining surface 203D (e.g. the wall of which defines unified conduit 110). Barrier 201A provided by the encapsulating nature of elastic-solid reaction product 201 is located between viscous fluid 101 and salt solution 210B.

Barrier 201A provided by the encapsulating nature of elastic-solid reaction product 201 may: provide ability to strain (e.g. to deform elastically) in response to elongation stresses (e.g. in response to hoop stresses, axial stresses and combinations thereof) as reaction product 201 (and barrier 201A) behave as a solid tube that is flexible (which is an improvement over having no barriers in conventional core-annular flow or viscoplastic barriers which may become fluid-like); and may prevent or mitigate contact between viscous fluid 101 and conduit-defining surface 203D.

The density mismatch between viscous fluid 101 and elastic-solid reaction product 201 may impact the cross-sectional positioning of viscous fluid 101 and/or reaction product 201 in unified conduit 110. This positioning may also be influenced by the orientation of axis 219 of system 100 (z-axis) relative to the direction of gravity. For ease of explanation, the drawings and explanation of this disclosure assume that z-direction is generally horizontal, although this is not necessary. Depending on the difference in density between viscous fluid 101 and elastic-solid reaction product 201, viscous fluid 101 may "sink" or "float" within unified conduit 110 displacing and/or deforming one or both of viscous fluid 101 and elastic-solid reaction product 201. Viscous fluid 101 may find an equilibrium cross-sectional position and shape that may be displaced from central axis 219 of unified conduit 110. In this way, viscous fluid 101 and elastic-solid reaction product 201 may take any suitable shape and position within unified conduit 110 while reaction product 201 encapsulates viscous fluid 101.

Reaction product 201 may have any of the properties as previously described in PCT/CA2021/050326 and/or PCT/CA2022/051899. Reaction product 201 may have a tensile strength that is greater than or equal to 600 kPa. In some embodiments, hydrogel reactant solution 220 may comprise alginate and fiber additives, such as wood pulp fiber and/or the like, which at least in part facilitate reaction product 201 having a tensile strength that is greater than or equal to 600 kPa. Reaction product 201 may have a tensile strength that is greater than a maximum pressure viscous fluid 101 would exert directly on unified conduit 110 with no lubrication (e.g. viscous fluid 101 in direct contact with conduit-defining surface 203D). This may ensure that the encapsulating barrier 201A provided by reaction product 201 can remain intact while moving through unified conduit 110.

In some embodiments, one or both of salt solution 210 and hydrogel reactant solution 220 may include constituents (e.g. reactants, additives, inert materials, etc.) that strengthen elastic-solid reaction product 201. For example, one or both of salt solution 210 and hydrogel reactant solution 220 may comprise a UV curable material that when cured hardens and strengthens reaction product 201. In some such embodiments, solution 210 need not strictly be a salt solution and solution 220 need not strictly be a hydrogel reactant solution provided that they are fluids comprising suitable UV curable reactants. The UV curable material may begin curing when exposed to a UV light source. The UV light source may be positioned within unified conduit 110 and/or reaction conduit 207. UV curable material may be used to strengthen reaction product 201 as previously disclosed in PCT/CA2022/051899. As another example, one or both of salt solution 210 and hydrogel reactant solution 220 may comprise a heat curable material that when cured hardens and strengthens reaction product 201. The heat curable material may be cured when exposed to sufficient heat.

Reaction product 201 is an elastic-solid material. Reaction product 201 is a flexible solid material. The elastic characteristics of reaction product 201 allow reaction product 201 to strain in response to hoop stresses, axial stresses and combinations thereof and to thereby conform with the shapes and changing shapes of viscous fluid 101 and/or unified conduit 110. For example, reaction product 201 may expand with viscous fluid 101 where unified conduit 110 expands. For example, reaction product 201 may contract with viscous fluid 101 where unified conduit 110 contracts. For example, reaction product 201 may bend with viscous fluid 101 where there are twists and/or turns and/or discontinuities in conduit-defining surface 203D and/or unified conduit 110. As reaction product 201 is an elastic solid, reaction product 201 may be represented by Young's modulus. The elastic-solid nature of reaction product 201 allows reaction product 201 to better conform to the shapes of unified conduit 110 and/or viscous fluid 101 in comparison to prior art alternatives.

Yet another advantage of the elastic-solid nature of reaction product 201 is the ability of reaction product 201 to ameliorate interfacial disturbances. If, instead of an elastic-solid reaction product 201, a liquid or a gel was used to encapsulate viscous fluid 101, there would be a risk that that the liquid or gel would fail (e.g. break or yield) when the flow of viscous fluid 101 is not laminar. Use of an elastic-solid reaction product 201 broadens the rheological and flow conditions under which stable core-annular flow can be achieved. Elastic-solid reaction product 201 is able to maintain its integrity when the flow of viscous fluid 101 is turbulent. Elastic-solid reaction product 201 is also able to maintain its integrity when the flow of lubricating salt solution layer 204B is turbulent.

Elastic-solid reaction product 201 may provide additional mechanisms to form sculpted shapes. In the context of core-annular flows, sculpting refers to a non-uniform longitudinal and/or circumferential shape of the annulus. Sculpting can also be referred to as deflection and/or deformation. Sculpting may assist core-annular flows with counteracting the effects of gravitational forces created by a mismatch of densities. This may be due to hydrodynamic lubrication resulting from the sculpted shape of the annulus formed by elastic-solid reaction product 201 which generates a lift force. Without wishing to be bound by theory, the inventors posit that the sculpted shape of elastic-solid reaction product 201 moving past conduit defining surface 203D in close proximity (i.e. separated only by salt solution layer 204B) generates a force normal to conduit defining surface 203D. The force normal to conduit defining surface 203D (which may be referred to as a lift force) may bias elastic-solid reaction product 201 away from conduit defining surface 203D.

If elastic-solid reaction product 201 was a liquid or a gel, achieving sculpting may require a time-dependent manipulation of inlet conditions of the flow in any one of annular passages 202B, 202C, and/or 202D.

For elastic-solid reaction product 201, the inventors posit that sculpting is achieved through a self-buckling mechanism. Under non-uniform loading conditions (e.g. by the application of different forces to different regions), elastic solid materials have a tendency to spontaneously deform (e.g. by exhibiting a wave-like external shape). This deformation may also be referred to as buckling. Elastic-solid reaction product 201 may deform due to different forces applied to different regions of elastic-solid reaction product 201 (e.g. a first region and a second region of elastic-solid reaction product 201, wherein at least a portion of the second region is outside of the first region). The different forces could have different magnitudes. The different forces could be due to different hydraulic pressures applied on different surfaces of reaction product 201 (e.g. first surface 201-1 and second surface 201-2 of elastic-solid reaction product 201), for example due to a difference in pressure between one or more of viscous fluid 101 and/or lubricating salt solution layer 204B. First surface 201-1 may be referred to as inner surface 201-1, and second surface 201-2 may be referred to as outer surface 201-2. In this regard, elastic-solid reaction product 201 may be referred to as self-buckling and/or self-sculpting. This represents a distinct advantage over non-elastic-solid core-annular flows which may require time dependent manipulation of inlet conditions to achieve a sculpted shape. Notwithstanding the foregoing, though, in some embodiments deformation of elastic-solid reaction product 201 may be achieved (e.g. at least in part) by time dependent manipulation of inlet conditions. For example, the flow rate of one or more of salt solution 210A, salt solution 210B, and/or hydrogel reactant solution 220 could be fluctuated to induce deformation on elastic-solid reaction product 201.

Another advantage of elastic-solid reaction product 201 is the lessened need for sculpting of the surface thereof relative to core-annular flows using a liquid or a gel. Depending on the particular elastic characteristics of elastic-solid reaction product 201 in relation to the forces applied thereon (e.g. gravitational forces, viscous forces or differential pressures applied to elastic-solid reaction product 201 by any one of viscous fluid 101, lubricating salt solution layer 204A or lubricating salt solution layer 204B), elastic-solid reaction product 201 may not deflect. Deflection refers to the displacement in the shape of reaction product 201 relative to its undisplaced shape. When viscous fluid 101 is buoyant, when elastic-solid reaction product 201 is sufficiently stiff, and if a moment can be supported at reaction conduit 207, sculpting may not be required to bias the annular flow away from conduit defining surface 203D.

The use of an elastic-solid reaction product 201 also broadens the process conditions to which elastic-solid reaction product 201 is applicable relative to two layer flow and/or three-layer flow with a viscoplastic material.

Elastic-solid reaction product 201 is able to accommodate viscous fluids 101 with a wide variety of rheological properties. Elastic-solid reaction product 201 is also able to accommodate solids in multiphase flow. For example, the physical properties of elastic-solid reaction product 201 mean that it has the ability to stretch and swell, which allows for an improved ability to encapsulate settled solids in multiphase flow. Elastic-solids can accommodate tensile strain without flowing. By contrast, a viscoplastic material can not accommodate a tensile strain without flowing.

Another advantage of elastic-solid reaction product 201 is its improved stability during start-up and shut-down conditions. Once viscous fluid 101 is encapsulated by elastic-solid reaction product 201, it may have an improved tendency to encapsulate viscous fluid 101 when flow stops and resist stratification (i.e. separation of constituent parts by density due to gravity). By contrast, if elastic-solid reaction product 201 was instead a fluid or a gel, stratification may result if the flow of viscous fluid 101 stops or starts (e.g. the constituents of the flow would separate on the basis of their density). By way of example, the flow of viscous fluid 101 could be stopped. The barrier between viscous fluid 101 and conduit defining surface 204D created by elastic-solid reaction product 201 could be maintained while the flow of viscous fluid 101 is stopped. Then, flow of viscous fluid 101 in the flow direction could be re-started. When flow is re-started, the barrier could be maintained (e.g. by elastic-solid reaction product 201 staying intact).

Elastic-solid reaction product 201 also has the ability to isolate viscous fluid 101 from conduit defining surface 203D. This may ameliorate rust and/or fouling that could occur from the interaction between viscous fluid 101 and conduit defining surface 203D.

Without wishing to be bound by theory, the inventors posit that core-annular flow as described herein can be described through the use of theoretical models.

Figure 5B:
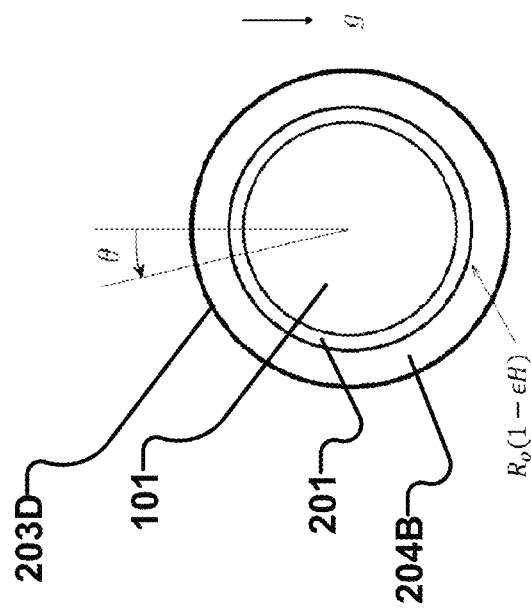
FIG. 5B is a schematic of the flow field in idealized core annular flow shown in cross section perpendicular to the flow direction.
Figure 5A:
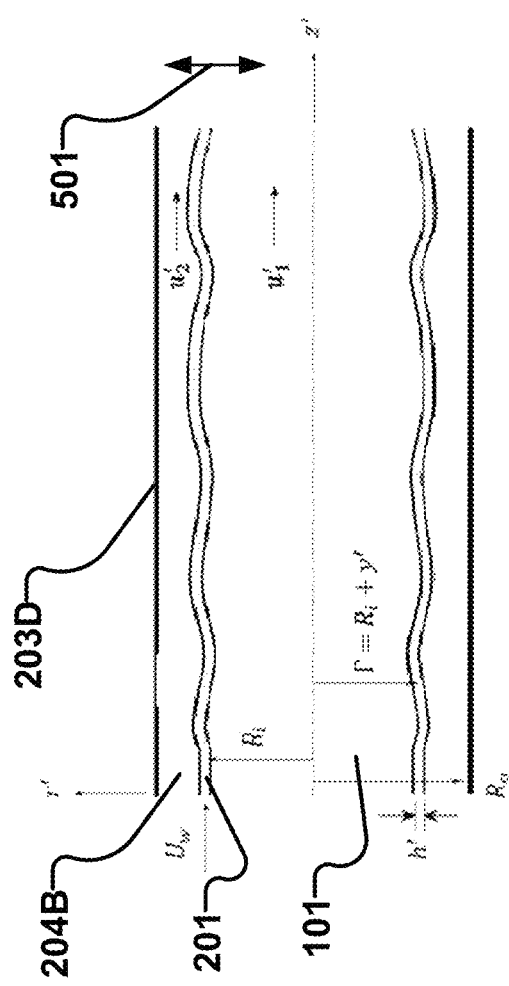
FIG. 5A is a schematic of the flow field in idealized core annular flow shown in cross section parallel to the flow direction.

FIG. 5A is a schematic of the flow field in idealized core annular flow shown in cross section parallel to the flow direction according to an example embodiment. FIG. 5B is a schematic of the flow field in idealized core annular flow shown in cross section perpendicular to the flow direction according to an example embodiment.

Without a loss of generalization, a horizontally oriented conduit with radius $R_0$ with fully developed laminar flow in the z' direction as shown in FIG. 5A is used to develop the theoretical model.

Three regimes are evident in FIG. 5A.

Lubricating salt solution layer 204B is defined in the region defined by equation 1a.

$$R_o(1-\epsilon H) \leq r' \leq R_o \tag{1a}$$

Viscous fluid 101 is limited to the region defined by equation 1b.

$$r' \leq R_o(1-\epsilon H) - h' \tag{1b}$$

Viscous fluid 101 may levitate or sink (in the directions indicated by arrow 501 in FIG. 5A) during travel in the z' direction.

Elastic solid reaction product 201 is drawn externally at a velocity defined by equation 1c.

$$u_w' = U_w e_z \tag{1c}$$

Elastic solid reaction product 201 is supported at the inlet of the conduit at a radial position $R_i$ as represented by equation 1d where $\epsilon$ denotes the annular gap where lubricating salt solution layer 204B is located.

$$R_i = R_i(1-\epsilon) \; \epsilon \to 0 \tag{1d}$$

Reaction product 201 is assumed to be of constant thickness h' and is thin in comparison to the radius of the pipe. Consequently, it can be assumed that h' is approximately equal to $\epsilon R_0$. As reaction product 201 is flexible, its centerline, represented by $\Gamma$, is decomposed into the equation represented by equation 1e.

$$\Gamma = R_i + y' \tag{1e}$$

Flow of viscous fluid 101 and salt solution layer 204B is generated by two driving forces: the motion of reaction product 201 and by an applied pressure drop. For the analysis herein, Newtonian fluid properties $\mu_i$ and density $\rho_i$ are defined in the viscous fluid 101 and salt solution layer 204B domains. This model can be extended to other rheological models.

Under the above noted assumptions, the equations of motion read as shown in equations 2a and 2b.

$$\nabla \cdot u_i' = 0 \; (i=1,2) \tag{2a}$$

$$\rho_i \left( \frac{\partial u_i'}{\partial t'} + u' \cdot \nabla u' \right) = -\nabla[p_i' + \rho_i g r' \cos(\theta)] + \mu_i \nabla^2 u_i' \tag{2b}$$

In equations 2a and 2b, $u_i$ is defined by the expression shown in equation 2c which represents the flow field. $p_i'$ in equation 2b is the pressure.

$$u_i'(r',\theta',z',t') = (u_i',v_i',w_i') \tag{2c}$$

The inventors posit that the equations of motion describing elastic-solid reaction product 201 can be described by equation 2d and 2e. In equation 2d and 2e, elastic-solid reaction product 201 is modelled as a flexible elastic shell.

$$h'^2 \left( \frac{\partial^4 y'}{\partial z'^4} + \frac{2}{R_i^2} \frac{\partial^2}{\partial \theta^2} \left( \frac{\partial^2 g'}{\partial z'^2} \right) + \frac{1}{R_i^4} \frac{\partial^4 g'}{\partial \theta^4} \right) = \frac{Eh'^3}{R_i} \left( \frac{\partial^2 y'}{\partial z'^2} \right) \tag{2d}$$

$$\frac{Eh'^3}{12(1-v)} \left( \frac{\partial^4 g'}{\partial z'^4} + \frac{2}{R_i^2} \frac{\partial^2}{\partial \theta^2} \left( \frac{\partial^2 y'}{\partial z^2} \right) + \frac{1}{R_i^4} \frac{\partial^4 y'}{\partial \theta^4} + \frac{1}{R_i^4} \frac{\partial^2 y'}{\partial \theta^2} \right) + \ldots + \tag{2e}$$

$$\frac{1}{R_i} \frac{\partial^2 g'}{\partial z'^2} + \left( \frac{p_2' - p_1'}{R_i} \right) \left( \frac{\partial^2 y'}{\partial \theta^2} \right) = 0$$

In equation 2d and 2e, E is the modulus of elasticity, v is Poisson's ratio, and g' is the Airy stress function. Prior art considers the encapsulating material in three-layer flow as a generalized Newtonian fluid (e.g. a viscoplastic), which differs from expression in 2d and 2e in the response to load.

The model was solved under a steady state assumption as set out below.

Boundary Conditions

The model was solved with boundary conditions. Traditional no-slip, no-penetration conditions at the wall of the pipe (e.g. conduit defining surface 203D) were applied as shown in equation 3a.

$$u_2' = v_2' = w_2' = 0 \text{ at } r' = R_o \tag{3a}$$

As shown in equations 13-15b, the trajectory of the centroid of the core follows the conduit axis to leading order in $\epsilon$. With that, the expression in equation 3b applies.

$$u_1' = v_1' = 0, \; w_1' \to \text{bounded at } r' = 0 \tag{3b}$$

The kinematic and dynamic conditions at the interface of lubricating salt solution layer 204B and elastic solid reaction product 201, as well as at the interface of viscous fluid 101 and elastic solid reaction product 201, as expressed in equations 3c, 3d and 3e were applied.

$$u_i' \cdot n = -\frac{1}{\|\nabla F_i\|} \frac{\partial F_i}{\partial t'} \tag{3c}$$

$$u_i' \cdot t_\theta = 0 \tag{3d}$$

$$u_i' \cdot t_{z'} = U_w \tag{3e}$$

In equations 3c, 3d, and 3e, n is the outward facing normal, $t_\theta$ and $t_{z'}$ are tangential vectors in the $\theta$ and z' directions respectively, and the function F is provided by equation 3f.

$$F_i = r' - (R_i + y') \tag{3f}$$

Equations 3a-3f imply that elastic-solid reaction product 201 translates without rotation.

It is assumed on the central vertical plane (i.e. the plane where $\theta=0$) that the following assumptions apply:

$$\frac{\partial u_i'}{\partial \theta} = \frac{\partial p_i'}{\partial \theta} = 0 \tag{3g}$$

$$\frac{\partial y'}{\partial \theta} = \frac{\partial g'}{\partial \theta} = \frac{\partial^3 y'}{\partial \theta^3} = \frac{\partial^3 g'}{\partial \theta^3} = 0 \text{ at } \theta = (0, \pi) \tag{3h}$$

Equations 3g and 3h imply that symmetry and no penetration conditions apply for velocity and pressure. Furthermore, the equations assume that the curvature of the film is finite.

At the inlet, it is assumed that elastic-solid reaction product 201 is introduced through a guide at $R_i$. As the motion of the elastic-solid reaction product is constrained vertically by the guide, and as it is stiff, a moment M' is applied at this point, which may be expressed per equation 3i.

$$y' = 0 \frac{\partial^2 y'}{\partial z'^2} = M'(\theta, t') \text{ at } z' = 0 \tag{3i}$$

At the outlet the elastic-solid reaction product is free defined as per equations 3j and 3k, where l represents the length of the conduit.

$$\frac{\partial y'}{\partial z'} = 0 \text{ at } z' = l \tag{3j}$$

$$\frac{\partial^2 y'}{\partial z'^2} = 0 \text{ at } z' = l \tag{3k}$$

The inlet and outlet pressures in viscous fluid 101 and lubricating salt solution layer 204B are defined as per equations 3l and 3m.

$$p_{1_j}' = P_{1_j}' \; j = \{\text{inlet,outlet}\} \tag{3l}$$

$$p_{2_j}' = P_{2_j}' \; j = \{\text{inlet,outlet}\} \tag{3m}$$

$P_{i,j}$ are functions which will be prescribed below.

Lubricating Salt Solution Layer 204B

The solution of the equations of motion for lubricating salt solution layer 204B is described below.

The equations of motion are first scaled using $U_w$ as the characteristic velocity. The characteristic length is set as $R_o$ and a balance of the pressure gradient with the viscous stress is considered per the expression in equation 4a.

$$\frac{P_{c_2}}{R_o} \sim \mu_2 \frac{U_w}{(\epsilon R_o)^2} \rightarrow P_{c_2} = \frac{\mu_2 U_w}{\epsilon^2 R_o} \tag{4a}$$

Equation 4a implies that the gravitational terms are small in comparison to the viscous terms. Consequently, the expression in equation 4b is derived.

$$\frac{P_{c_2}}{R_o} \sim \rho_2 g \rightarrow 1 \ll \epsilon^2 \left( \frac{\rho_2 g R_o^2}{\mu_2 U_w} \right) \tag{4b}$$

As the flow is three dimensional, each term in the continuity relationship described in equation 2a above must be retained. Consequently, the expression in equation 4c applies.

$$\frac{\mu_2'}{\epsilon R_o} \sim \frac{v_2'}{R_o} \sim \frac{w_2'}{R_o} \tag{4c}$$

Equation 4c means that the velocity field must be scaled as shown in equation 4d.

$$u_2' = U_w(\epsilon u_2, v_2, w_2) \tag{4d}$$

In equation 4d, $u_2$, $v_2$, and $w_2$ are dimensionless. If the independent variables are scaled using the equations in 4e and 4f, and if the dependent variables are mapped from (r', θ, z', t') to (η, θ, z, t) using equations 4g, 4h, and 4i, equations 2a and 2b then reduce to those shown in equations 4j, 4k, 4l and 4m, at leading order in $\epsilon$.

$$u_2' = U_w(\epsilon u_2, v_2, w_2) \tag{4e}$$

$$p_2' = P_{c_2} p_2 + O(\epsilon^2) \tag{4f}$$

$$r' = R_o(1 - \epsilon \eta) \tag{4g}$$

$$z' = R_o z \tag{4h}$$

$$t' = \frac{R_o}{U_w} t \tag{4i}$$

$$0 = -\frac{\partial}{\partial \eta} p_2 \tag{4j}$$

$$0 = -\frac{\partial}{\partial \theta} p_2 + \frac{\partial^2}{\partial \eta^2} v_2 \tag{4k}$$

$$0 = -\frac{\partial}{\partial z} p_2 + \frac{\partial^2}{\partial \eta^2} w_2 \tag{4l}$$

$$0 = -\frac{\partial}{\partial \eta} u_2 + \frac{\partial}{\partial \theta} v_2 + \frac{\partial}{\partial z} w_2 \tag{4m}$$

The boundary conditions (equation 3a) on the pipe wall (e.g. conduit defining surface 203D) therefore are described as per equation 4n.

$$\eta = 0: u_2 = v_2 = w_2 = 0 \tag{4n}$$

The kinematic conditions (equations 3c, 3d, and 3e) reduce to those shown in equation 4o at leading order.

$$\eta = H: \begin{cases} u_2 = -\frac{\partial H}{\partial t} - \frac{\partial H}{\partial z} \\ v_2 = 0 \\ w_2 = 1 \end{cases} \tag{4o}$$

The symmetry conditions (equation 3g) therefore read as shown in equation 4p.

$$\frac{\partial p_2}{\partial \theta} = 0, \text{ at } \theta = (0, \pi) \tag{4p}$$

$P_2$, as defined in equations 3l and 3m, needs to be defined. For mathematical convenience, the inlet and outlet pressures are defined as a uniform pressure (i.e. there is no variation with (r, θ)). Temporal variations in the inlet pressure are allowed for. Equations 4q and 4r are therefore applicable.

$$z=0 \; P_{2_{inlet}} = \alpha_2 \tag{4q}$$

$$z=l/R_o \; P_{2_{outlet}} = \alpha_2(1-f_2) \tag{4r}$$

In equations 4q and 4r, $f_2$ is a constant. Equations 4a through 4r represent a reduced-order model. Equations 4a through 4r can be reduced in a two-step procedure. In the first step, ($v_2$, $w_2$) are solved as a function of $p_2$. In the second step, the continuity relationship in equation 4m is averaged over the thickness of the lubricating salt solution area thereby eliminating $u_2$, leaving an expression for which $p_2$ must satisfy. If equations 5a to 5c apply, where $$\lambda_2 = f \frac{R_0}{l},$$

then equation 5d applies when solved in conjunction with equations 4n-40.

$$p_2 = F(\theta, z, t) + \alpha_2(1 - \lambda_2 z) \tag{5a}$$

$$v_2 = \left(\frac{\partial F}{\partial \theta}\right) V_2(\eta, \theta, z) \tag{5b}$$

$$w_2 = \left(\frac{\partial F}{\partial z}\right) W_2(\eta, \theta, z) + \frac{\eta}{H} - (\alpha_2 \lambda_2) W_3(\eta, \theta, z) \tag{5c}$$

$$V_2 = W_2 = W_3 = \frac{1}{2}\left(\eta^2 - H\eta\right) \tag{5d}$$

In the second step, equation 4m is integrated over the thickness of the film per equation 5e.

$$0 = \int_0^H \frac{\partial u_2}{\partial \eta} d\eta = \int_0^H \left[\frac{\partial v_2}{\partial \theta} + \frac{\partial w_2}{\partial z}\right] d\eta \tag{5e}$$

Using equations 4n to 4o, it can be found that equation 6a applies with the conditions articulated in equations 6b and 6c.

$$12\frac{\partial H}{\partial t} + 6\left(1 + \frac{\alpha_2 \lambda_2}{2} H^2\right)\frac{\partial H}{\partial z} = \frac{\partial}{\partial \theta}\left[H^3 \frac{\partial F}{\partial \theta}\right] + \frac{\partial}{\partial z}\left[H^3 \frac{\partial F}{\partial z}\right] \tag{6a}$$

$$\frac{\partial F}{\partial \theta} = 0, \text{ at } \theta = (0, \pi) \tag{6b}$$

$$F = 0, \text{ at } z = (0, l/R_o) \tag{6c}$$

Viscous Fluid 101

The equations of motion for the core are scaled using $U_w$ as the characteristic velocity. The characteristic length is set as $R_0$. A viscous scaling is applied, and the pressure gradient is balanced with the viscous stresses in equation 2b per equation 7a.

$$\frac{P_{c_1}}{R_o} \sim \mu_2 \frac{U_w}{R_o^2} \rightarrow P_{c_1} = \frac{\mu_1 U_w}{R_o} \tag{7a}$$

The equations are simplified using a domain perturbation method.

Conceptually, the exact boundary conditions from equations 3c, 3d and 3e are replaced with an approximate boundary condition that is asymptotically equivalent for $\epsilon \ll 1$ but is applied at the surface r'=$R_0$. The method of domain perturbations leads to a regular perturbation expansion in the small parameter E. At leading order the flow is a superposition of a Hagen-Poiseuille flow with a Couette flow as the conduit wall has a circular cross section. Deviations brought about by deflection of the reaction product are considered as $O(\epsilon)$ defects. The independent variables are scaled using equations 7b and 7c.

$$u_1' = U_w(\epsilon u_1, \epsilon v_2, w_1(r) + \epsilon w_2) + O(\epsilon^2) \tag{7b}$$

$$p_1' = P_{c_1} p_1 + O(\epsilon) \tag{7c}$$

In equations 7b and 7c, equations $u_i$, $v_i$, $W_1$ and $w_1$ are dimensionless. The dependent variables in equation 2 are mapped from (r',θ,z',t')→(ξ,θ,z,t) using the equations in 7d, 7e, and 7f.

$$r' = R_1 \xi \tag{7d}$$

$$z' = R_o z \tag{7e}$$

$$t' = \frac{R_o}{U_w} t \tag{7f}$$

Equations 7g-7i therefore apply at leading order in $\epsilon$.

$$0 = -\frac{\partial}{\partial \xi} p_1 + \frac{\rho_1 R_o g}{P_{c_1}} \cos\theta \tag{7g}$$

$$0 = -\frac{\partial}{\partial \theta} p_1 - \frac{\rho_1 R_o g}{P_{c_1}} \xi \sin\theta \tag{7h}$$

$$0 = -\frac{\partial}{\partial z} p_1 + \frac{\partial^2}{\partial \xi^2} W_1 \tag{7i}$$

The complexity of the solution depends on the form of the functions in equations 3l and 3m. Equations 7j and 7k are applied.

$$P_{1_{inlet}} = \alpha_1(t) - \frac{\rho_1 R_o g}{P_{c_1}} \xi \cos\theta \tag{7j}$$

$$P_{1_{outlet}} = \alpha_1(t)(1 - \lambda_1) - \frac{\rho_1 R_o g}{P_{c_1}} \cos\theta \tag{7k}$$

In equations 7j and 7k, $\alpha_1$ and $\lambda_1 \geq 1$. Equations 7j and 7k represent the inlet pumping pressure and pressure drop respectively.

Using the boundary conditions noted above, it can be deduced that equation 7l applies.

$$p_1 = \frac{\rho_1 R_o g}{P_c} \xi \cos\theta + \alpha_1(1 - \lambda_1 z) \tag{7l}$$

Consequently, equation 7m can be derived.

$$W_1 = 1 + \frac{1}{4}\alpha_1 \lambda_1 (1 - \xi^2) \tag{7m}$$

Equation 7m represents simple Hagen-Poiseuille flow superimposed onto a Couette flow. The domain perturbation assumption ξ∈[0,1] is applicable above.

Elastic-Solid Reaction Product 201 Position

The independent variables of equation 2 are scaled using equations 8a, 8b, and 8c.

$$g' = \epsilon \left(\frac{Eh^3}{12(1-\nu)}\right) G(\theta, z, t), \tag{8a}$$

$$y' = \epsilon R_i Y \tag{8b}$$

$$h' = \epsilon R_o h \tag{8c}$$

The dependent variables are mapped from z' to z using equation 8d.

$$z' = R_i z \tag{8d}$$

To reduce the number of variables, y' is expressed in terms of H. At the mid-plane of the elastic-solid reaction product, equation 8e can be derived, which reduces to equation 8f using equations 8a-8c.

$$\Gamma = R_i + y' = R_o(1 - \epsilon H) + h'/2 \tag{8e}$$

$$Y = -H + h + 1 + (-H + h + 1)\epsilon + O(\epsilon^2) \tag{8f}$$

Using equations 8a-8c and 8f, equations 2d and 2e reduce to equations 9a and 9b, where $p_2$, $\delta$, and $c^2$ are as shown in equations 9c, 9d and 9e.

$$\frac{\partial^4 G}{\partial z^4} + \frac{\partial^2}{\partial \theta^2}\left(\frac{\partial^2 G}{\partial z'^2}\right) + \frac{\partial^4 G}{\partial \theta^4} = -c^2\left(\frac{\partial^2 H}{\partial z'^2}\right) \tag{9a}$$

$$\frac{\partial^4 H}{\partial z^4} + 2\frac{\partial^2}{\partial \theta^2}\left(\frac{\partial^2 H}{\partial z^2}\right) + \frac{\partial^4 H}{\partial \theta^4} = \frac{\partial^2 G}{\partial z^2} - (1 + \delta p_2)\frac{\partial^2 H}{\partial \theta^2} \tag{9b}$$

$$p_2 = F + \alpha_2(1 - \lambda_2 z) \tag{9c}$$

$$\delta = \frac{12(1-v)\mu_2 U_w R_o^2}{E\epsilon^2 h'^3} \tag{9d}$$

$$c^2 = \frac{12(1-v)R_o^2}{h'^2} \tag{9e}$$

System of equations 6 and 9 are the model system to be solved.

Approximate Solution

A steady state solution is examined using a regular perturbation expansion in $\delta \rightarrow 0$. Seeking a solution in the form of equations 10a, 10b, and 10c, equations 6 and 9 reduce to those shown in equations 10d, 10e, and 10f, with $$\nabla^2_{(s)}$$

($\cdot$) defined per equation 10g.

$$H = 1 + \delta \tilde{H} + O(\delta^2) \tag{10a}$$

$$F = \delta \tilde{F} + O(\delta^2) \tag{10b}$$

$$G = \delta \tilde{G} + O(\delta^2) \tag{10c}$$

$$\nabla^2_{(s)} \tilde{F} = (6 + 3\alpha_2 \lambda_2)\frac{\partial \tilde{H}}{\partial z} \tag{10d}$$

$$\nabla^2_{(s)}(\nabla^2_{(s)} \tilde{G}) = -c^2\left(\frac{\partial^2 \tilde{H}}{\partial z^2}\right) \tag{10e}$$

$$\nabla^2_{(s)}(\nabla^2_{(s)} \tilde{H}) = -(\alpha_2 \delta(1-\lambda_2 z) + 1)\frac{\partial^2 \tilde{H}}{\partial \theta^2} + \frac{\partial^2 \tilde{G}}{\partial z^2} \tag{10f}$$

$$\nabla^2_{(s)}(\cdot) \equiv \frac{\partial^2}{\partial \theta^2}(\cdot) + \frac{\partial^2}{\partial z^2}(\cdot) \tag{10g}$$

Equations 11a-11c are applied.

$$\tilde{H} = \sum_{n=1} H_n(z)\cos(n\theta) \tag{11a}$$

$$\tilde{F} = \sum_{n=1} F_n(z)\cos(n\theta) \tag{11b}$$

$$\tilde{G} = \sum_{n=1} G_n(z)\cos(n\theta) \tag{11c}$$

System of equations 10 therefore reduces to the equations shown in 11d to 11g.

$$\frac{d^2}{dz^2}F_n = F_n n^2 + 6\frac{d}{dz}H_n + 3\alpha_2\lambda_2\left(\frac{d}{dz}H_n\right) \tag{11d}$$

$$\frac{d^4}{dz^4}G_n = 2\left(\frac{d^2}{dz^2}G_n\right)n^2 - G_n n^4 - c^2\left(\frac{d}{dz}H_n\right) \tag{11e}$$

$$\frac{d^4}{dz^4}H_n = +2\left(\frac{d^2}{dz^2}H_1\right)n^2 - H_1 n^4 - n^2(1+\tilde{p})H_1 + \frac{d^2}{dz^2}G_1 \tag{11f}$$

$$\tilde{p} = \delta\alpha_2(1 - z\lambda_2) \tag{11g}$$

Equations 11d to 11g are subject to the conditions shown in equations 11h, 11i, and 11j at the inlet (i.e., z=0), and the conditions shown in equations 11k, and 11l at the outlet (i.e., z=l/R$_0$).

$$F_n = H_n = G_n = 0 \text{ at } z = 0 \tag{11h}$$

$$\frac{\partial^2 H_n}{\partial z^2} = M_n \text{ at } z = 0 \tag{11i}$$

$$\frac{\partial^2 G_n}{\partial z^2} = 0 \text{ at } z = 0 \tag{11j}$$

$$F_n = G_n = 0 \text{ at } z = \ell/R_o \tag{11k}$$

$$\frac{\partial H_n}{\partial z} = \frac{\partial^2 H_n}{\partial z^2} = \frac{\partial^2 G_n}{\partial z^2} = 0 \text{ at } z = \ell/R_o \tag{11l}$$

The system of equations were solved in MATLAB as a boundary value problem using the built-in function bvp4c.

As evident from the above derivation, a large number of dimensionless groups govern the equations. Three dimensionless groups are focused on, namely ($\delta, \alpha_2, \Pi$) where $\delta$ represents the ratio of the viscous stress to the stiffness of the elastic-solid reaction product, $\alpha_2$ represents the ratio of the inlet pressure to the viscous stress, and $\Pi$ is the product of $\delta$ and $\alpha_2$ and represents the ratio of the inlet pressure to the stiffness of the elastic-solid reaction product.

Over the range of parameters modelled, two distinctly characteristic shapes of the elastic-solid reaction product were observed: seemingly rigid and self-sculpting. Self-sculpting represents periodic buckling in the elastic-solid reaction product generated by non-uniform loading. Seemingly-rigid represents deflection which is difficult to detect.

Figure 6B:
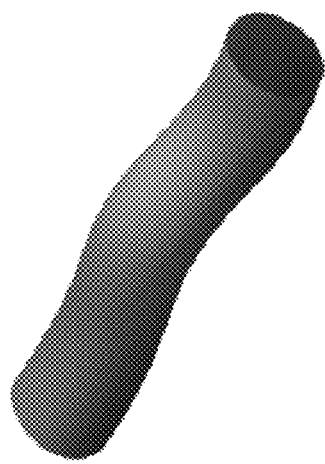
FIG. 6B is a computationally derived model of the elastic solid reaction product under a self-sculpting regime.
Figure 6C:
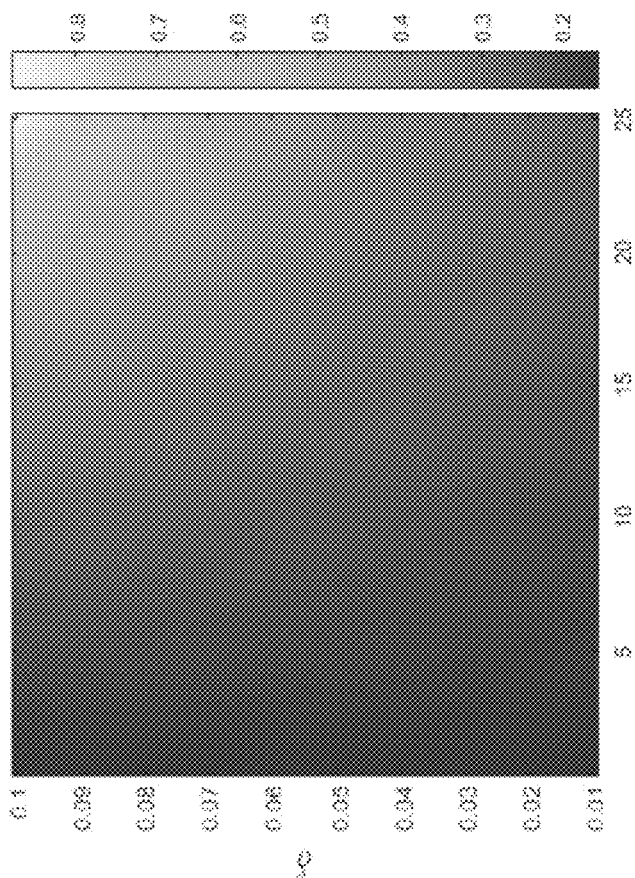
FIG. 6C is a graph of lubrication force as a function of dimensionless variables $\delta$ and $\alpha_2$.
Figure 6A:
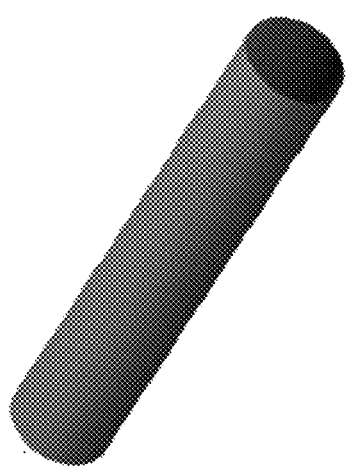
FIG. 6A is a computationally derived model of the elastic solid reaction product under a seemingly rigid regime.

A computer generated model of a seemingly rigid regime for the reaction product is shown in FIG. 6A. A computer generated model of a self-sculpting regime for the reaction product is shown in FIG. 6B.

FIG. 6C shows the lubrication force (i.e. the variable F in equation 9c) as a function of $\delta$ and $\alpha_2$. As evident from FIG. 6C, lubrication force increases with increasing $\delta$ and $\alpha_2$, or conversely with increasing $\delta$ or $\Pi$. The amplitude of sculpting increases with increasing lubrication force. The aforementioned derivation and modelling shows that self-sculpting results from buckling created from elastic effects.

Experimental Results

Further embodiments are described with reference to the following experimental results, which are intended to be illustrative and not limiting in scope.

An experimental campaign was conducted to test the feasibility of system 100. In the experiments, conduit-defining surface 203D had a diameter of 52 mm. Tubular wall 203A, tubular wall 203B, and tubular wall 203C were created at the inlet of system 100 with a 3-D extrusion printed manifold. Flow was induced by variable-frequency driven positive displacement pumps from inlet reservoirs of approximately 500L capacity. Volumetric flowrates were measured using a Rosemount 8711 flowmeter. The pumps provided a total maximum flow rate of 30 L/min. Laminar flow was not achievable under the process conditions provided by the experimental setup for cases C and D. Pressure was measured at two locations along system 100 axially spaced apart by 1 m with a Rosemount 1151DP differential pressure transducer.

Five different experiments were run as shown in Table 1.

TABLE 1

| Case | Material (wt/wt %) | | | Density [kg/m³] | |
|---|---|---|---|---|---|
| | Viscous Fluid 101 | Lubricating salt solution layer 204B | Elastic-solid reaction product 201 | Viscous Fluid 101 | Lubricating salt solution layer 204B |
| A | 2% CaCl₂ | 2% CaCl₂ | 1% Alginate | 1010 | 1010 |
| B | 5% sand + .3% CaCl₂ | 2% CaCl₂ | 1% Alginate | 1030 | 1010 |
| C | .5% Xanthan + 15% sand + .3% CaCl₂ | 2% CaCl₂ | 1% Alginate | 1100 | 1010 |
| D | .5% Xanthan + .3% CaCl₂ | 2% CaCl₂ | 1% Alginate | 1004 | 1010 |
| E | 4% CaCl₂ | 2% CaCl₂ | 1% Alginate | 1020 | 1010 |

Average velocity for each layer at the inlet of system 100 in the experimental setup was set at 0.55 m/s.

The rheological properties of the xanthan gum solutions (i.e. cases C and D where viscous fluid 101 comprised a xanthan gum solution) were determined with an AR2000 rheometer (TA Instruments). 60 mm diameter parallel plates were used. Slip was eliminated by attaching 46 μm grit sandpaper on to the surfaces of the parallel plates. The 0.5% xanthan gum solution was found to follow that of a cross fluid with constants $\mu_\infty=1$ mPa·s; $\mu_0=332$ Pa·s; n=0.82; λ=115 s. A cross fluid is a type of fluid with a viscosity that is dependent on shear rate per equation 12. Cross fluid describes psuedoplastic flow with asymptotic velocities at zero ($\mu_0$) and infinite ($\mu_\infty$) shear rates and no yield stress. The constant n in equation 12 represents the flow index and is dimensionless. The constant λ describes the consistency index of the fluid (i.e. the resistance to shear).

$$\mu_{effective}(\dot{Y}) = \mu_\infty + \frac{\mu_0 - \mu_\infty}{1 + (\lambda\dot{Y})^n} \tag{12}$$

In equation 12, $\dot{Y}$ is the shear rate measured in reciprocal seconds, and $\mu_{effective}(\dot{Y})$ is the effective viscosity as a function of the shear rate.

Five different conditions were tested, as shown in Table 1. Case A is neutrally-buoyant (i.e. salt solution layer 204B and viscous fluid 101 have the same density). Case B and C represent a viscous fluid 101 that is more dense than salt solution layer 204B. Case B and C also represent viscous fluid 101 comprising multi-phase flow. Case D represents a viscous fluid 101 with non-Newtonian properties (due to Xanthan gum's shear thinning behavior). Case E represents a viscous fluid 101 under which shut down conditions were tested.

Figure 7B:
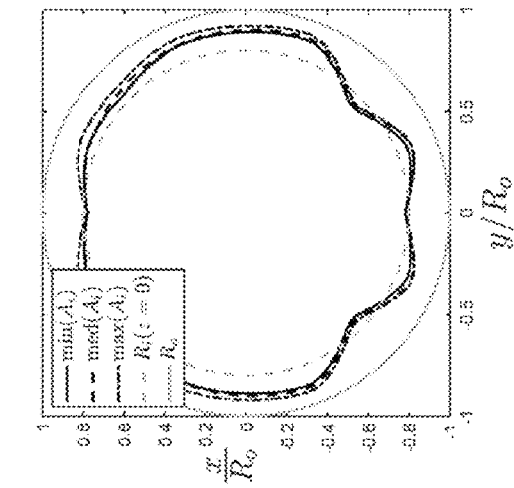
FIG. 7B is a cross section of the conduit in the experimental setup.
Figure 7A:
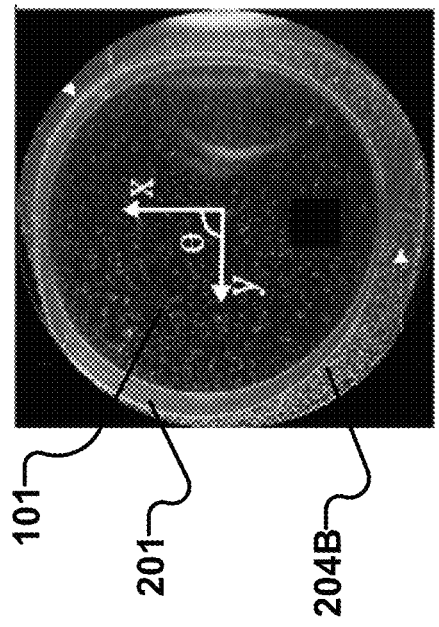
FIG. 7A is a schematic of an experiment simulating the conditions of the example system of FIG. 1.

The shape of reaction product 201 was visualized with a 24.2MP Canon EOS Rebel T7i DSLR camera illuminated by a Dantec Dynamics Ray-Power 5000 continuous wavelength laser. A schematic of the experimental setup is shown in FIG. 7A. A cross section of the conduit is shown in FIG. 7B. For experimental convenience, reaction product 201 was measured on a 45° angle relative to the flow direction, with the schematics thereafter being transformed to the xy plane in MATLAB as shown in FIG. 7B. After images were denoised, binarized and segmented, H(θ,t) was estimated and subsequently the centroid and cross-sectional area of the core using the method outlined below.

Interface conditions are applied at the centroid C(θ,z',t') of the core region. The trajectory of the centroid is defined by the function C(θ,z',t') given by equation 13 below.

$$C = \frac{1}{3A}|\zeta| \tag{13}$$

In equation 13, A is defined per equation 14a below, and ζ is defined per equation 14b below.

$$A = \frac{1}{2}\int_0^{2\pi} r_i'^2 d\theta \tag{14a}$$

$$\zeta = \int_0^{2\pi} r_i'^3 e^{i\theta} d\theta \tag{14b}$$

Using equations 14a, and 14b, equations 15a and 15b can be derived.

$$A = \frac{R_o^2}{2} + O(\epsilon) \tag{15a}$$

$$\zeta = O(\epsilon) \tag{15b}$$

Consequently, to a leading order, the centroid of the core follows the axis of the pipe.

After completion of the experiment, reaction product 201 was recovered and the average thickness thereof was measured to be 200 μm with a Young's modulus of E=0.4 MPa.

Stable core-annular flow was achieved for all tests conducted. No stratification was observed. No dispersed or intermittent slugs (i.e. periodic ejections of the central fluid) were observed.

Figure 7D:
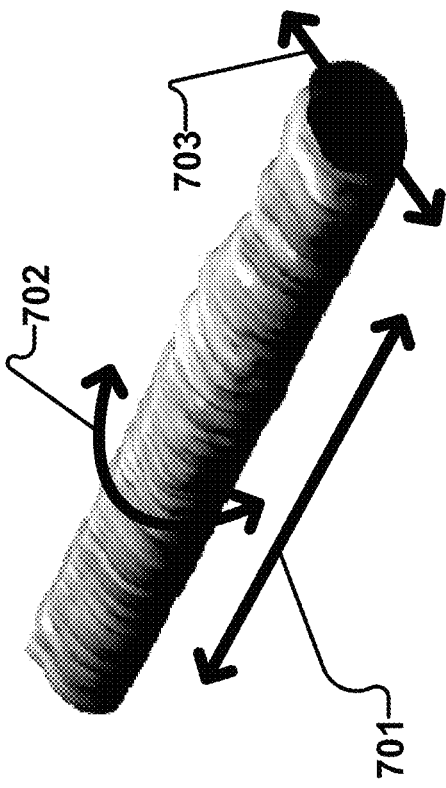
FIG. 7D is graph showing the average position of the reaction product within a conduit for case A.
Figure 7C:
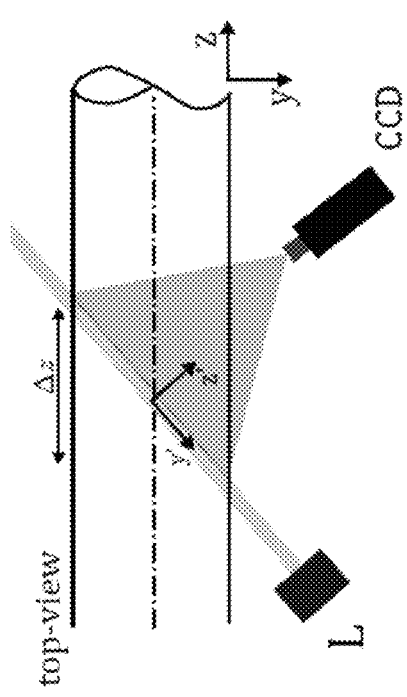
FIG. 7C is a composite image of the shape of the reaction product as a function of time for case B.

Viscous fluid 101 remained encapsulated and adopted a sculpted structure, as shown in FIG. 7C and FIG. 7D. In FIG. 7C, individual measurements were stitched together to obtain a composite image of the surface of reaction product 201 for case B. As visible in FIG. 7C, reaction product 201 may deform in one or more directions, for example (but not limited to): (a) longitudinally along the axis parallel to the flow direction as shown by the direction indicated by arrow 701, (b) torsionally about the axis parallel to the flow direction indicated by arrow 702, and/or (c) transversely in a direction away from the axis parallel to the flow direction as indicated by arrow 703. Deformations (also referred to as deflection and/or buckling) in any one of the aforementioned directions can provide a hydrodynamic lift force that biases reaction product 201 away from conduit defining surface 203D. Individual snapshots were averaged over a 5 minute period at circumferential positions about reaction product 201 for case A as shown in FIG. 7D.

Figure 8A:
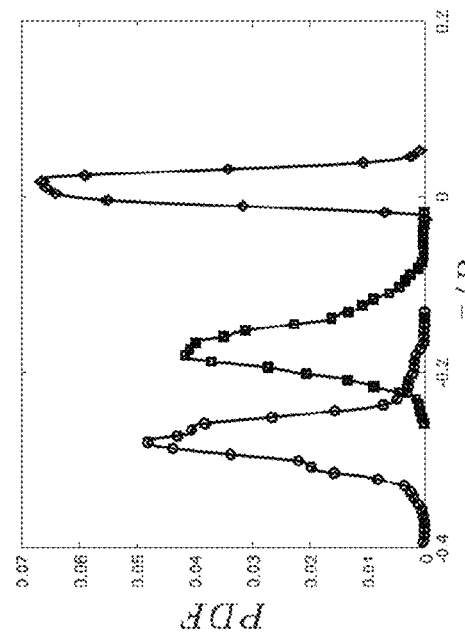
FIG. 8A is a graph showing cross sectional distribution of the reaction product for a selection of cases.
Figure 8B:
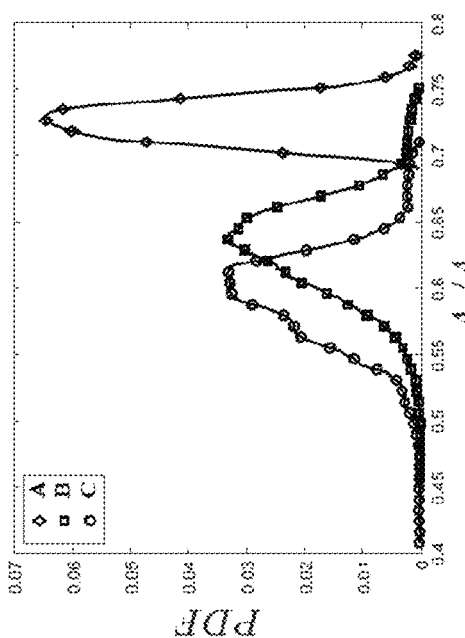
FIG. 8B is a graph showing the distribution of the vertical centroid of the viscous fluid for a selection of cases.

The centroid of viscous fluid 101 levitated or shifted downward slightly from the central axis of conduit-defining surface 203D depending on the density configuration as shown in FIG. 8A and FIG. 8B. In FIG. 8A, the cross-sectional area for cases A to C in Table 1 were recorded for 3 minutes. Recordings started when the axial pressure gradient stabilized for at least one minute. FIG. 8B shows the distribution of the vertical centroid from each recording shown in FIG. 8A.

Figure 9:
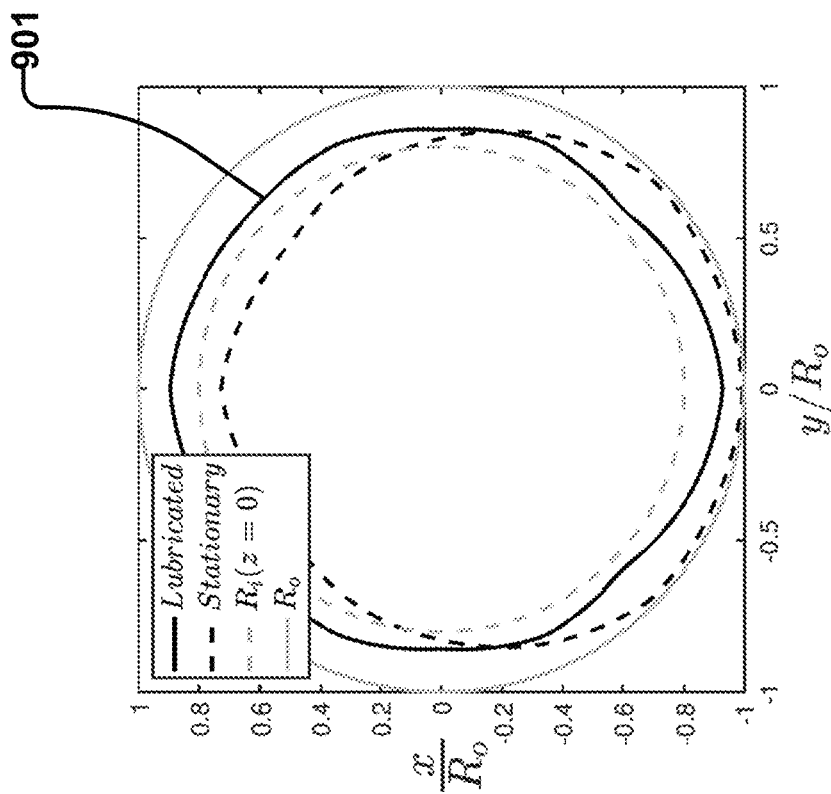
FIG. 9 is a graph showing the position of the reaction product, including after shutdown, for case E.

FIG. 9 shows the circumferential positions of the elastic-solid reaction product for case E. After shutdown, viscous fluid 101 remained encapsulated and sunk to the bottom of the system as shown in FIG. 9. The lubrication force created by the self-sculpting properties of reaction product 201 stabilized the flow as shown by line 901.

Figure 10B:
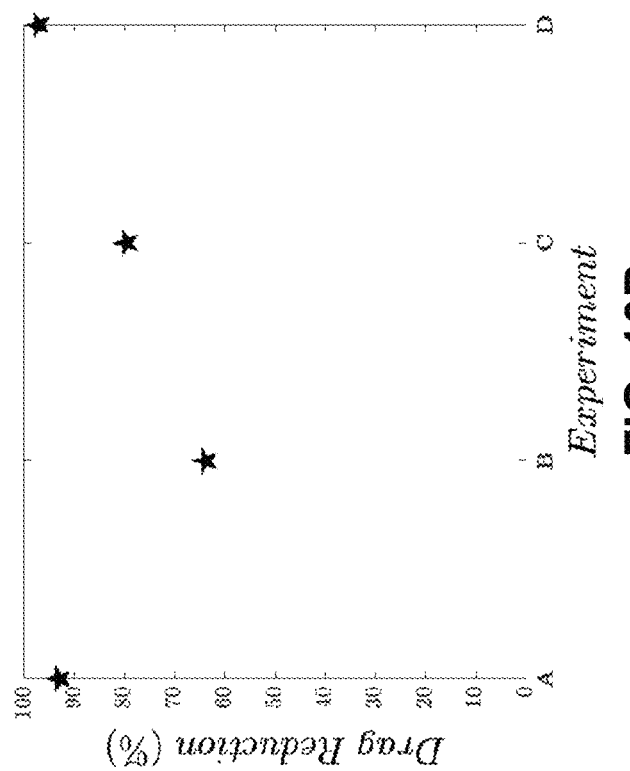
FIG. 10B is a graph showing drag reduction for each tested case.
Figure 10A:
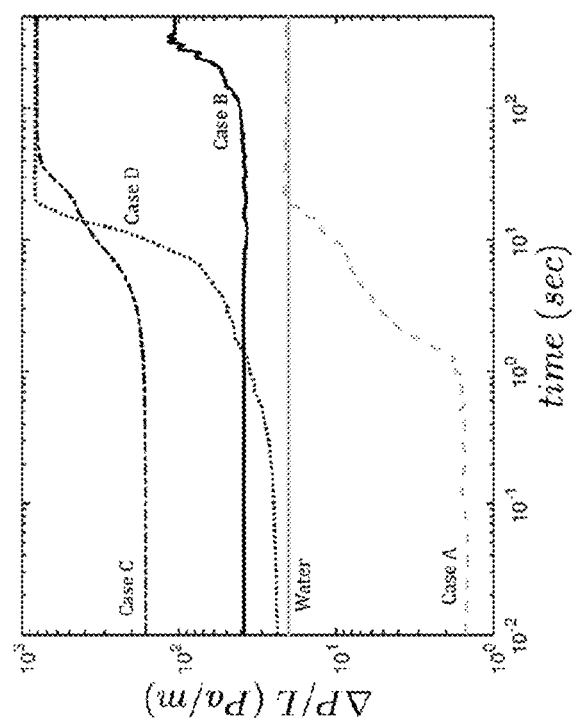
FIG. 10A is a graph showing pressure drop for each tested case.

Significant drag reductions for all cases were observed as shown in FIG. 10A and FIG. 10B. In FIG. 10A, pressure drop measurements in lubricating salt solution layer 204B were measured as a function of time. The left hand time series represents the case when the flow is fully encapsulated by reaction product 201. After reaction product 201 is removed from the channel and viscous fluid 101 fills up the entire conduit, the pressure drop changes and the system reaches a new steady state as shown on the righthand side of the time series. FIG. 10B shows drag reduction for each case where drag reduction is represented per equation 16.

$$DR = 1 - \frac{\Delta P(t=0)}{\Delta P(t_{end})} \quad (16)$$

Where $\Delta P(t=0)$ represents the pressure drop at an initial point in time, and where $\Delta P(t_{end})$ represents the pressure drop after 500 seconds. The pressure drop after 500 seconds represents steady state pressure drop in the system with no encapsulation. Drag reduction occurs when DR is greater than zero; drag increases when DR is less than zero.

Interpretation of Terms

Unless the context clearly requires otherwise, throughout the description and the claims:
"comprise", "comprising", and the like are to be construed in an inclusive sense, as opposed to an exclusive or exhaustive sense; that is to say, in the sense of "including, but not limited to";
"connected", "coupled", or any variant thereof, means any connection or coupling, either direct or indirect, between two or more elements; the coupling or connection between the elements can be physical, logical, or a combination thereof;
"herein", "above", "below", and words of similar import, when used to describe this specification, shall refer to this specification as a whole, and not to any particular portions of this specification;
"or", in reference to a list of two or more items, covers all of the following interpretations of the word: any of the items in the list, all of the items in the list, and any combination of the items in the list;
the singular forms "a", "an", and "the" also include the meaning of any appropriate plural forms.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Where a component (e.g. a conduit, tubular wall, contact region, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

The invention includes a number of non-limiting aspects. Non-limiting aspects of the invention comprise:

1. A method for transporting a material in a conduit defined by a conduit-defining surface, the method comprising:
   flowing a first fluid and a second fluid in a flow direction within the conduit;
   contacting the first and second fluids to one another at a contact region to thereby facilitate a reaction creating a reaction product in an interface region that extends downstream from the contact region, wherein the reaction product is an elastic-solid; and
   transporting the material in the flow direction within the conduit;
   wherein, at locations downstream of the interface region, the reaction product creates a barrier between the material and the conduit-defining surface.

2. A method for reducing drag associated with transporting a material in a flow direction in a conduit defined by a conduit-defining surface, the method comprising:

facilitating a reaction within the conduit, to thereby create a reaction product that is an elastic-solid and that creates a barrier between the material and the conduit-defining surface, the reaction product and the barrier created by the reaction product moving in the flow direction with the material.

3. The method of aspect 2 or any other aspect herein further comprising:
flowing a first fluid and a second fluid in the flow direction within the conduit; and
contacting the first and second fluids to one another at a contact region to thereby facilitate the reaction in an interface region that extends downstream from the contact region;
wherein the reaction product creates the barrier at locations downstream of the interface region.

4. The method of any one of aspects 1 or 3 or any other aspect herein wherein transporting the material in the flow direction within the conduit comprises flowing a viscous fluid in the flow direction within the conduit.

5. The method of aspect 4 or any other aspect herein wherein the viscous fluid comprises a fluid having a viscosity greater than a viscosity of water.

6. The method of any one of aspects 1, 3, or 4 to 5 or any other aspect herein wherein the material comprises one or more of: heavy crude oil, mining tailings, bitumen, a slurry, a paste, or a caustic material.

7. The method of any one of aspects 1, 3, or 4 to 6 or any other aspect herein wherein the material is one of: neutrally buoyant, positively buoyant, or negatively buoyant in the first fluid.

8. The method of any one of aspects 1, 3, or 4 to 7 or any other aspect herein wherein flowing the first fluid and the second fluid in the flow direction within the conduit comprises keeping the first and second fluids from contacting one another at locations upstream of the contact region.

9. The method of aspect 8 or any other aspect herein wherein flowing the first fluid and the second fluid in the flow direction within the conduit comprises flowing the first fluid in the flow direction in a first conduit at locations upstream of the contact region and flowing the second fluid in the flow direction in a second conduit at locations upstream of the contact region, the first and second conduits physically separated from one another to thereby keep the first and second fluids from contacting one another at locations upstream of the contact region.

10. The method of aspect 9 or any other aspect herein wherein the first and second conduits comprise at least one wall therebetween to keep the first and second conduits physically separated from one another.

11. The method of aspect 10 or any other aspect herein wherein the at least one wall is a tubular wall.

12. The method of any one of aspects 9 to 11 or any other aspect herein wherein contacting the first and second fluids to one another at the contact region comprises merging the first and second conduits with one another.

13. The method of any one of aspects 10 to 11 or any other aspect herein wherein contacting the first and second fluids to one another at the contact region comprises discontinuing the at least one wall at locations upstream of the contact region.

14. The method of any one of aspects 1, 3, or 4 to 13 or any other aspect herein comprising:
flowing a third fluid in the flow direction within the conduit;
contacting the second and third fluids to one another at a second contact region to thereby facilitate a reaction creating the reaction product in a second interface region that extends downstream from the second contact region.

15. The method of aspect 14 or any other aspect herein wherein the third fluid is the same as the first fluid.

16. The method of any one of aspects 14 to 15 or any other aspect herein wherein the second contact region is at a same location along the flow direction as the contact region.

17. The method of any one of aspects 14 to 16 or any other aspect herein wherein flowing the third fluid in the flow direction within the conduit comprises keeping the second and third fluids from contacting one another at locations upstream of the second contact region.

18. The method of aspect 17 or any other aspect herein wherein flowing the second fluid in the flow direction within the conduit comprises flowing the second fluid in the flow direction in a second conduit at locations upstream of the second contact region and flowing the third fluid in the flow direction in a third conduit at locations upstream of the second contact region, the second and third conduits physically separated from one another to thereby keep the second and third fluids from contacting one another at locations upstream of the second contact region.

19. The method of aspect 18 or any other aspect herein wherein the second and third conduits comprise at least one second wall therebetween to thereby keep the second and third conduits physically separated from one another.

20. The method of aspect 19 or any other aspect herein wherein the at least one second wall is a tubular wall.

21. The method of any one of aspects 18 to 20 or any other aspect herein wherein contacting the second and third fluids to one another at the second contact region comprises merging the second and third conduits with one another.

22. The method of any one of aspects 19 to 20 or any other aspect herein wherein contacting the second and third fluids to one another at the second contact region comprises discontinuing the at least one second wall at locations upstream of the second contact region.

23. The method of any one of aspects 1, 3, or 4 to 22 or any other aspect herein wherein transporting the material in the flow direction within the conduit comprises keeping the material separate from other materials moving in the flow direction within the conduit at locations upstream of the contact region.

24. The method of aspect 23 or any other aspect herein wherein keeping the material separate from other materials moving in the flow direction within the conduit at locations upstream of the contact region comprises providing a separate conduit for the material, the separate conduit separating the material from the other materials moving in the flow direction within the conduit.

25. The method of aspect 24 or any other aspect herein wherein providing the separate conduit for the material comprises providing at least one third wall that separates the material from the other materials moving in the flow direction within the conduit.

26. The method of aspect 25 or any other aspect herein wherein the at least one third wall is a tubular wall.

27. The method of any one of aspects 25 to 26 or any other aspect herein comprising discontinuing the at least one third wall at locations downstream of the contact region.
28. The method of any one of aspects 1, 3, or 4 to 27 or any other aspect herein wherein the reaction product and the barrier created by the reaction product move in the flow direction within the conduit.
29. The method of any one of aspects 1, 3, or 4 to 28 or any other aspect herein wherein, at locations downstream of the interface region, the reaction product creates the barrier between the material and the first fluid.
30. The method of any one of aspects 1, 3, or 4 to 29 or any other aspect herein wherein the reaction product and the barrier created by the reaction product are able to strain in response to stresses.
31. The method of aspect 30 or any other aspect herein wherein the stresses are one or more of: elongation stress, hoop stress, and axial stress.
32. The method of any one of aspects 1, 3, or 4 to 31 or any other aspect herein wherein the first fluid comprises a salt solution.
33. The method of aspect 32 or any other aspect herein wherein the salt solution comprises metal ions.
34. The method of aspect 33 or any other aspect herein wherein the metal ions are polyvalent metal ions.
35. The method of aspect 34 or any other aspect herein wherein the polyvalent metal ions comprise one or more of: divalent metal ions and trivalent metal ions.
36. The method of any one of aspects 1, 3, or 4 to 35 or any other aspect herein wherein the first fluid comprises a chelating agent.
37. The method of any one of aspects 1, 3, or 4 to 36 or any other aspect herein wherein the second fluid comprises a hydrogel reactant solution.
38. The method of aspect 37 or any other aspect herein wherein the hydrogel reactant solution comprises one or more of alginate or anionic polyacrylamide.
39. The method of any one of aspects 37 to 38 or any other aspect herein wherein the hydrogel reactant solution comprises one or more of: pulp fiber, phase changing materials, reinforcing agents and polysaccharides.
40. The method of any one of aspects 1, 3, or 4 to 39 or any other aspect herein wherein one or both of the first and second fluids comprise a UV curable material.
41. The method of any one of aspects 1, 3, or 4 to 40 or any other aspect herein wherein one or both of the first and second fluids comprise a heat curable material.
42. The method of any one of aspects 14 to 22 or any other aspect herein further comprising permitting a secondary reaction between the material and at least one of the first fluid and the third fluid to create a secondary reaction product.
43. The method of aspect 42 or any other aspect herein wherein the secondary reaction product comprises a viscoplastic.
44. The method of any one of aspects 42 to 43 or any other aspect herein wherein the secondary reaction product moves in the flow direction within the conduit.
45. The method of any one of aspects 14 to 22 or any other aspect herein further comprising permitting the material to mix with a portion of at least one of the first fluid and the third fluid.
46. The method of any one of aspects 1, 3, or 4 to 45 or any other aspect herein wherein the reaction product has a tensile strength that is greater than the maximum pressure exerted by the material.
47. The method of any one of aspects 1, 3, or 4 to 46 or any other aspect herein wherein the reaction product has a tensile strength that is greater than or equal to 600 kPa.
48. The method of any one of aspect 1, 3, or 4 to 47 or any other aspect herein further comprising:
    applying a first force to a first region of the reaction product, and applying a second force to a second region of the reaction product, at least a portion of the second region outside of the first region, thereby causing the reaction product to deform.
49. The method of aspect 48 or any other aspect herein wherein the first force and the second force have a different magnitude.
50. The method of any one of aspects 48 to 49 or any other aspect herein wherein the first region is an inner surface of the reaction product, and wherein the second region is an outer surface of the reaction product.
51. The method of any one of aspects 48 to 50 or any other aspect herein wherein the first force is created by the application of a first hydraulic pressure at the first region of the reaction product, and wherein the second force is created by the application of a second hydraulic pressure at the second region of the reaction product.
52. The method of any one of aspects 1, 3, or 4 to 51 or any other aspect herein further comprising deforming the reaction product by adjusting a flow rate of one or both of the first fluid and the second fluid.
53. The method of any one of aspects 48 to 52 or any other aspect herein wherein the reaction product deforms one or more of: longitudinally along an axis parallel to the flow direction, transversely in a direction away from the axis parallel to the flow direction, and torsionally about the axis parallel to the flow direction.
54. The method of any one of aspects 48 to 53 or any other aspect herein further comprising generating a lift force in a lift direction normal to the conduit defining surface, wherein the lift force is generated by hydrodynamic lift created by the first fluid flowing between the conduit defining surface and the deformed reaction product.
55. The method of any one of aspects 48 to 53 or any other aspect herein further comprising generating a lift force in one or more directions away from the conduit defining surface, wherein the lift force is generated by hydrodynamic lift created by the first fluid flowing between the conduit defining surface and the deformed reaction product.
56. The method of any one of aspects 54 to 55 or any other aspect herein further comprising biasing the material away from the conduit defining surface with the lift force.
57. The method of any one of aspects 1, 3, or 4 to 56 or any other aspect herein further comprising:
    stopping the transport of the material in the flow direction within the conduit;
    maintaining the barrier between the material and the conduit defining surface while the transport of the material is stopped;
    re-starting the transport of the material in the flow direction within the conduit; and
    maintaining the barrier after the flow of the material is re-started.
58. The method of any one of aspects 1, 3, or 4 to 57 or any other aspect herein further comprising encapsulating the material with the reaction product.

59. The method of any one of aspects 1, 3, or 4 to 58 or any other aspect herein further comprising isolating the conduit defining surface from the material with the barrier created by the reaction product.

60. The method of aspect 59 or any other aspect herein comprising inhibiting fouling of the conduit defining surface with the barrier.

61. The method of aspect any one of aspects 59 to 60 or any other aspect herein comprising inhibiting rusting of the conduit defining surface with the barrier.

62. Use of an elastic-solid to reduce drag associated with transporting a material in a flow direction in a conduit defined by a conduit-defining surface, the use comprising:
    facilitating a reaction within the conduit, to thereby create a reaction product that is an elastic-solid and that creates a barrier between the material and the conduit-defining surface, the reaction product and the barrier created by the reaction product moving in the flow direction with the material.

63. The use of aspect 62 or any other aspect herein wherein facilitating the reaction within the conduit comprises:
    flowing a first fluid and a second fluid in the flow direction within the conduit; and
    contacting the first and second fluids to one another at a contact region to thereby facilitate the reaction in an interface region that extends downstream from the contact region;
    wherein the reaction product creates the barrier at locations downstream of the interface region.

64. The use of aspect 63 or any other aspect herein wherein transporting the material in the flow direction within the conduit comprises flowing a viscous fluid in the flow direction within the conduit.

65. The use of aspect 64 or any other aspect herein wherein the viscous fluid comprises a fluid having a viscosity greater than a viscosity of water.

66. The use of any one of aspects 63 to 65 or any other aspect herein wherein the material comprises one or more of: heavy crude oil, mining tailings, bitumen, a slurry, a paste, or a caustic material.

67. The use of any one of aspects 63 to 66 or any other aspect herein wherein the material is one of: neutrally buoyant, positively buoyant, or negatively buoyant in the first fluid.

68. The use of any one of aspects 63 to 67 or any other aspect herein wherein flowing the first fluid and the second fluid in the flow direction within the conduit comprises keeping the first and second fluids from contacting one another at locations upstream of the contact region.

69. The use of aspect 68 or any other aspect herein wherein flowing the first fluid and the second fluid in the flow direction within the conduit comprises flowing the first fluid in the flow direction in a first conduit at locations upstream of the contact region and flowing the second fluid in the flow direction in a second conduit at locations upstream of the contact region, the first and second conduits physically separated from one another to thereby keep the first and second fluids from contacting one another at locations upstream of the contact region.

70. The use of aspect 69 or any other aspect herein wherein the first and second conduits comprise at least one wall therebetween to keep the first and second conduits physically separated from one another.

71. The use of aspect 70 or any other aspect herein wherein the at least one wall is a tubular wall.

72. The use of any one of aspects 69 to 71 or any other aspect herein wherein contacting the first and second fluids to one another at the contact region comprises merging the first and second conduits with one another.

73. The use of any one of aspects 70 to 71 or any other aspect herein wherein contacting the first and second fluids to one another at the contact region comprises discontinuing the at least one wall at locations upstream of the contact region.

74. The use of any one of aspects 63 to 73 or any other aspect herein comprising:
    flowing a third fluid in the flow direction within the conduit;
    contacting the second and third fluids to one another at a second contact region to thereby facilitate a reaction creating the reaction product in a second interface region that extends downstream from the second contact region.

75. The use of aspect 74 or any other aspect herein wherein the third fluid is the same as the first fluid.

76. The use of any one of aspects 74 to 75 or any other aspect herein wherein the second contact region is at a same location along the flow direction as the contact region.

77. The use of any one of aspects 74 to 76 or any other aspect herein wherein flowing the third fluid in the flow direction within the conduit comprises keeping the second and third fluids from contacting one another at locations upstream of the second contact region.

78. The use of aspect 77 or any other aspect herein wherein flowing the second fluid in the flow direction within the conduit comprises flowing the second fluid in the flow direction in a second conduit at locations upstream of the second contact region and flowing the third fluid in the flow direction in a third conduit at locations upstream of the second contact region, the second and third conduits physically separated from one another to thereby keep the second and third fluids from contacting one another at locations upstream of the second contact region.

79. The use of aspect 78 or any other aspect herein wherein the second and third conduits comprise at least one second wall therebetween to thereby keep the second and third conduits physically separated from one another.

80. The use of aspect 79 or any other aspect herein wherein the at least one second wall is a tubular wall.

81. The use of any one of aspects 78 to 80 or any other aspect herein wherein contacting the second and third fluids to one another at the second contact region comprises merging the second and third conduits with one another.

82. The use of any one of aspects 79 to 80 or any other aspect herein wherein contacting the second and third fluids to one another at the second contact region comprises discontinuing the at least one second wall at locations upstream of the second contact region.

83. The use of any one of aspects 63 to 82 or any other aspect herein wherein transporting the material in the flow direction within the conduit comprises keeping the material separate from other materials moving in the flow direction within the conduit at locations upstream of the contact region.

84. The use of aspect 83 or any other aspect herein wherein keeping the material separate from other materials moving in the flow direction within the conduit at locations upstream of the contact region comprises providing a separate conduit for the material, the separate conduit separating the material from the other materials moving in the flow direction within the conduit.

85. The use of aspect 84 or any other aspect herein wherein providing the separate conduit for the material comprises providing at least one third wall that separates the material from the other materials moving in the flow direction within the conduit.

86. The use of aspect 85 or any other aspect herein wherein the at least one third wall is a tubular wall.

87. The use of any one of aspects 85 to 86 or any other aspect herein comprising discontinuing the at least one third wall at locations downstream of the contact region.

88. The use of any one of aspects 63 to 87 or any other aspect herein wherein the reaction product and the barrier created by the reaction product move in the flow direction within the conduit.

89. The use of any one of aspects 63 to 88 or any other aspect herein wherein, at locations downstream of the interface region, the reaction product creates the barrier between the material and the first fluid.

90. The use of any one of aspects 63 to 89 or any other aspect herein wherein the reaction product and the barrier created by the reaction product are able to strain in response to stresses.

91. The use of aspect 90 or any other aspect herein wherein the stresses are one or more of: elongation stress, hoop stress, and axial stress.

92. The use of any one of aspects 63 to 91 or any other aspect herein wherein the first fluid comprises a salt solution.

93. The use of aspect 92 or any other aspect herein wherein the salt solution comprises metal ions.

94. The use of aspect 93 or any other aspect herein wherein the metal ions are polyvalent metal ions.

95. The use of aspect 94 or any other aspect herein wherein the polyvalent metal ions comprise one or more of: divalent metal ions and trivalent metal ions.

96. The use of any one of aspects 63 to 95 or any other aspect herein wherein the first fluid comprises a chelating agent.

97. The use of any one of aspects 63 to 96 or any other aspect herein wherein the second fluid comprises a hydrogel reactant solution.

98. The use of aspect 97 or any other aspect herein wherein the hydrogel reactant solution comprises one or more of alginate or anionic polyacrylamide.

99. The use of any one of aspects 97 to 98 or any other aspect herein wherein the hydrogel reactant solution comprises one or more of: pulp fiber, phase changing materials, reinforcing agents and polysaccharides.

100. The use of any one of aspects 63 to 99 or any other aspect herein wherein one or both of the first and second fluids comprise a UV curable material.

101. The use of any one of aspects 63 to 100 or any other aspect herein wherein one or both of the first and second fluids comprise a heat curable material.

102. The use of any one of aspects 74 to 82 or any other aspect herein further comprising permitting a secondary reaction between the material and at least one of the first fluid and the third fluid to create a secondary reaction product.

103. The use of aspect 102 or any other aspect herein wherein the secondary reaction product comprises a viscoplastic.

104. The use of any one of aspects 102 to 103 or any other aspect herein wherein the secondary reaction product moves in the flow direction within the conduit.

105. The use of any one of aspects 74 to 82 or any other aspect herein further comprising permitting the material to mix with a portion of at least one of the first fluid and the third fluid.

106. The use of any one of aspects 63 to 105 or any other aspect herein wherein the reaction product has a tensile strength that is greater than the maximum pressure exerted by the material.

107. The use of any one of aspects 63 to 106 or any other aspect herein wherein the reaction product has a tensile strength that is greater than or equal to 600 kPa.

108. The use of any one of aspect 63 to 107 or any other aspect herein further comprising:
applying a first force to a first region of the reaction product, and applying a second force to a second region of the reaction product, at least a portion of the second region outside of the first region, thereby causing the reaction product to deform.

109. The use of aspect 108 or any other aspect herein wherein the first force and the second force have a different magnitude.

110. The use of any one of aspects 108 to 109 or any other aspect herein wherein the first region is an inner surface of the reaction product, and wherein the second region is an outer surface of the reaction product.

111. The use of any one of aspects 108 to 110 or any other aspect herein wherein the first force is created by the application of a first hydraulic pressure at the first region of the reaction product, and wherein the second force is created by the application of a second hydraulic pressure at the second region of the reaction product.

112. The use of any one of aspects 63 to 111 or any other aspect herein further comprising deforming the reaction product by adjusting a flow rate of one or both of the first fluid and the second fluid.

113. The use of any one of aspects 108 to 112 or any other aspect herein wherein the reaction product deforms one or more of: longitudinally along an axis parallel to the flow direction, transversely in a direction away from the axis parallel to the flow direction, and torsionally about the axis parallel to the flow direction.

114. The use of any one of aspects 108 to 113 or any other aspect herein further comprising generating a lift force in a lift direction normal to the conduit defining surface, wherein the lift force is generated by hydrodynamic lift created by the first fluid flowing between the conduit defining surface and the deformed reaction product.

115. The use of any one of aspects 108 to 113 or any other aspect herein further comprising generating a lift force in one or more directions away from the conduit defining surface, wherein the lift force is generated by hydrodynamic lift created by the first fluid flowing between the conduit defining surface and the deformed reaction product.

116. The use of any one of aspects 114 to 115 or any other aspect herein further comprising biasing the material away from the conduit defining surface with the lift force.

117. The use of any one of aspects 63 to 116 or any other aspect herein further comprising:

stopping the transport of the material in the flow direction within the conduit;

maintaining the barrier between the material and the conduit defining surface while the transport of the material is stopped;

re-starting the transport of the material in the flow direction within the conduit; and maintaining the barrier after the flow of the material is re-started.

118. The use of any one of aspects 63 to 117 or any other aspect herein further comprising encapsulating the material with the reaction product.

119. The use of any one of aspects 63 to 118 or any other aspect herein further comprising isolating the conduit defining surface from the material with the barrier created by the reaction product.

120. The use of aspect 119 or any other aspect herein comprising inhibiting fouling of the conduit defining surface with the barrier.

121. The use of aspect any one of aspects 119 to 120 or any other aspect herein comprising inhibiting rusting of the conduit defining surface with the barrier.

122. Apparatus having any new and inventive feature, combination of features, or sub-combination of features as described herein.

123. Methods having any new and inventive steps, acts, combination of steps and/or acts or sub-combination of steps and/or acts as described herein.

124. Uses having any new and inventive steps, acts, combination of steps and/or acts or sub-combination of steps and/or acts as described herein.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A method for transporting a material in a conduit defined by a conduit-defining surface, the method comprising:

flowing a first fluid and a second fluid in a flow direction within the conduit;

contacting the first and second fluids to one another at a contact region to thereby facilitate a reaction creating a reaction product in an interface region that extends downstream from the contact region, wherein the reaction product is an elastic-solid; and transporting the material in the flow direction within the conduit;

wherein, at locations downstream of the interface region, the reaction product creates a barrier between the material and the conduit-defining surface.

2. The method of claim 1 wherein transporting the material in the flow direction comprises flowing a viscous fluid in the flow direction within the conduit.

3. The method of claim 1 wherein flowing the first fluid and the second fluid in the flow direction within the conduit comprises keeping the first and second fluids from contacting one another at locations upstream of the contact region.

4. The method of claim 3 wherein flowing the first fluid and the second fluid in the flow direction within the conduit comprises flowing the first fluid in the flow direction in a first conduit at locations upstream of the contact region and flowing the second fluid in the flow direction in a second conduit at locations upstream of the contact region, the first and second conduits physically separated from one another to thereby keep the first and second fluids from contacting one another at locations upstream of the contact region, wherein the first and second conduits comprise at least one wall therebetween to keep the first and second conduits physically separated from one another.

5. The method of claim 4 wherein contacting the first and second fluids to one another at the contact region comprises merging the first and second conduits with one another.

6. The method of claim 4 wherein contacting the first and second fluids to one another at the contact region comprises discontinuing the at least one wall at locations upstream of the contact region.

7. The method of claim 1 comprising:

flowing a third fluid in the flow direction within the conduit;

contacting the second and third fluids to one another at a second contact region to thereby facilitate a reaction creating the reaction product in a second interface region that extends downstream from the second contact region.

8. The method of claim 7 wherein the third fluid is the same as the first fluid.

9. The method of claim 7 wherein the second contact region is at a same location along the flow direction as the contact region.

10. The method of claim 7 wherein flowing the third fluid in the flow direction within the conduit comprises keeping the second and third fluids from contacting one another at locations upstream of the second contact region.

11. The method of claim 10 wherein flowing the second fluid in the flow direction within the conduit comprises flowing the second fluid in the flow direction in a second conduit at locations upstream of the second contact region and flowing the third fluid in the flow direction in a third conduit at locations upstream of the second contact region, the second and third conduits physically separated from one another to thereby keep the second and third fluids from contacting one another at locations upstream of the second contact region, wherein the second and third conduits comprise at least one second wall therebetween to thereby keep the second and third conduits physically separated from one another.

12. The method of claim 11 wherein contacting the second and third fluids to one another at the second contact region comprises merging the second and third conduits with one another.

13. The method of claim 11 wherein contacting the second and third fluids to one another at the second contact region comprises discontinuing the at least one second wall at locations upstream of the second contact region.

14. The method of claim 7 further comprising permitting a secondary reaction between the material and at least one of the first fluid and the third fluid to create a secondary reaction product, wherein the secondary reaction product comprises a viscoplastic.

15. The method of claim 1 wherein transporting the material in the flow direction within the conduit comprises keeping the material separate from other materials moving in the flow direction within the conduit at locations upstream of the contact region by providing a separate conduit for the material, the separate conduit separating the material from the other materials moving in the flow direction within the conduit.

16. The method of claim 1 wherein the reaction product and the barrier created by the reaction product move in the flow direction within the conduit.

17. The method of claim 1 wherein, at locations downstream of the interface region, the reaction product creates the barrier between the material and the first fluid, wherein the reaction product and the barrier created by the reaction product are able to strain in response to stresses, and wherein the reaction product has a tensile strength that is greater than the maximum pressure exerted by the material.

18. The method of claim 1 wherein the first fluid comprises one or both of: a salt solution, and a chelating agent.

19. The method of claim 1 wherein the second fluid comprises a hydrogel reactant solution.

20. The method of claim 1 comprising:
applying a first force to a first region of the reaction product, and applying a second force to a second region of the reaction product, at least a portion of the second region outside of the first region, thereby causing the reaction product to deform.

21. The method of claim 1 further comprising:
stopping the transport of the material in the flow direction within the conduit;
maintaining the barrier between the material and the conduit defining surface while the transport of the material is stopped;
re-starting the transport of the material in the flow direction within the conduit; and
maintaining the barrier after the flow of the material is re-started.

* * * * *